US008086026B2

(12) United States Patent (10) Patent No.: US 8,086,026 B2
Schulz (45) Date of Patent: Dec. 27, 2011

(54) METHOD AND SYSTEM FOR THE DETERMINATION OF OBJECT POSITIONS IN A VOLUME

(75) Inventor: Waldean Allen Schulz, Boulder, CO (US)

(73) Assignee: Waldean Schulz, Boulder, CO (US)

( * ) Notice: Subject to any disclaimer, the term of this patent is extended or adjusted under 35 U.S.C. 154(b) by 852 days.

(21) Appl. No.: 12/163,353

(22) Filed: Jun. 27, 2008

(65) Prior Publication Data

US 2009/0324009 A1 Dec. 31, 2009

(51) Int. Cl.
*G06K 9/00* (2006.01)
(52) U.S. Cl. .................................... 382/154
(58) Field of Classification Search .............. 382/103, 382/104, 105, 154, 285, 291, 293
See application file for complete search history.

(56) References Cited

U.S. PATENT DOCUMENTS

| | | | |
|---|---|---|---|
| 6,061,644 | A | 5/2000 | Leis |
| 6,288,785 | B1 | 9/2001 | Frantz |
| 6,442,416 | B1 | 8/2002 | Schulz |
| 6,978,167 | B2 | 12/2005 | Dekel |
| RE39,102 | E | 5/2006 | Schulz |
| 7,049,594 | B2 | 5/2006 | Wu |
| 7,106,898 | B2 * | 9/2006 | Bouguet et al. ............. 382/154 |
| 7,643,025 | B2 * | 1/2010 | Lange .......................... 345/419 |
| 2001/0043739 | A1 * | 11/2001 | Oshino et al. ............... 382/154 |
| 2002/0024593 | A1 * | 2/2002 | Bouguet et al. ............. 348/46 |
| 2004/0002642 | A1 | 1/2004 | Dekel |
| 2007/0183041 | A1 | 8/2007 | McCloy |
| 2009/0022365 | A1 * | 1/2009 | Kotake ........................ 382/103 |

OTHER PUBLICATIONS

Roger Tsai; "A Versatile Camera Calibration Technique for High-Accuracy 3D Machine Vision Metrology Using Off-the-Shelf TV Cameras and Lenses", IEEE Journal of Robotics and Automation, vol. RA-3, No. 4; Aug. 1987.
"Computer Vision for Better Healthcare"; Claron Technology, Inc.; Internet "http://www.clarontech.com/measurement_technology.php", Jun. 26, 2008.
"3-D Creator"; Boulder Innovation Group; Internet "http://www.boulderinnovators.com/indhard.html"; Jun. 26, 2008.
"Polaris Family"; Northern Digital, Inc.; Internet "http://www.ndigital.com/medical/polarisfamily.php"; Sep. 26, 2007.
Melanie Bohn; "BrainLAB Neurosurgery Solutions", product brochure, p. 8; BrainLAB AG, , Germany; 2005.
"Eagle Eye: The 7-D Vision System"; Kinetic Sciences; Internet "www.kinetic.bc.ca/CompVision/Eagle Eye.html"; Jan. 28, 2003.

* cited by examiner

*Primary Examiner* — Brian Le

(57) ABSTRACT

A method or a system embodiment determines positional information about a moveable object to which is affixed a pattern of stripes having reference lines. A method determines image lines of stripe images of each stripe within at least two video frames, uses the image lines to prescribe planes having lines of intersection, and determines a transformation mapping reference lines to lines of intersection. Position information about the object may be derived from the transformation. A system embodiment comprises a pattern of stripes in a known fixed relationship to an object, reference lines characterizing the stripes, two or more cameras at known locations, a digital computer adapted to receive video frames from the pixel arrays of the cameras, and a program stored in the computer's memory. The program performs some or all of the method. When there are two or more moveable objects, an embodiment may further determine the position information about a first object to be transformed to a local coordinate system fixed with respect to a second object.

28 Claims, 11 Drawing Sheets

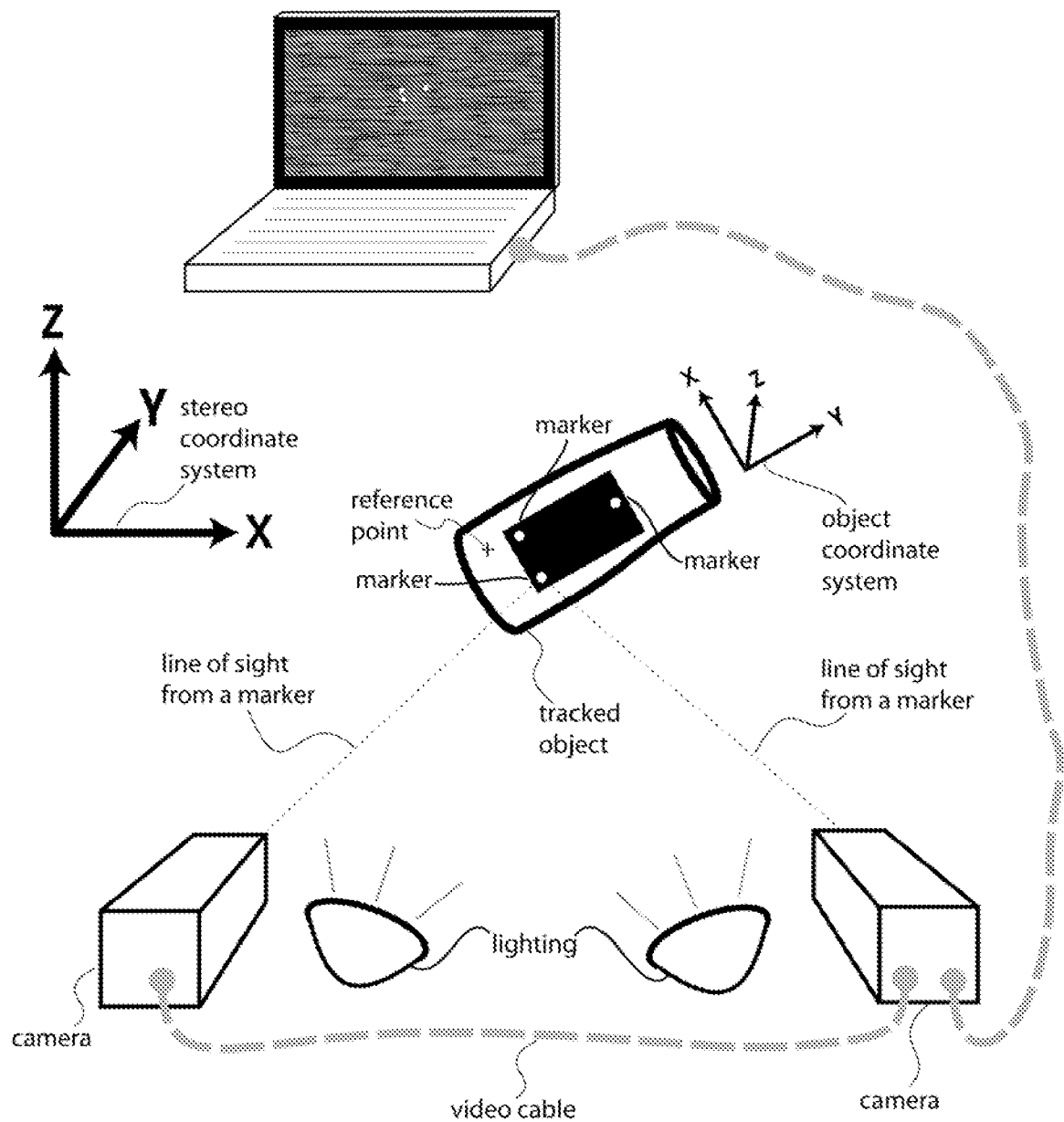
Figure 1a – prior art

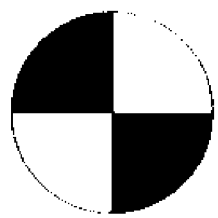
Figure 1b – prior art
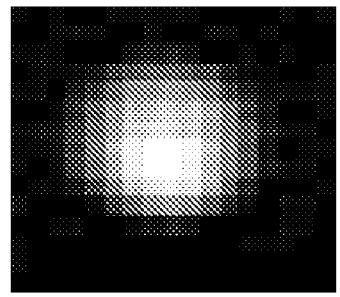
Figure 1c – prior art
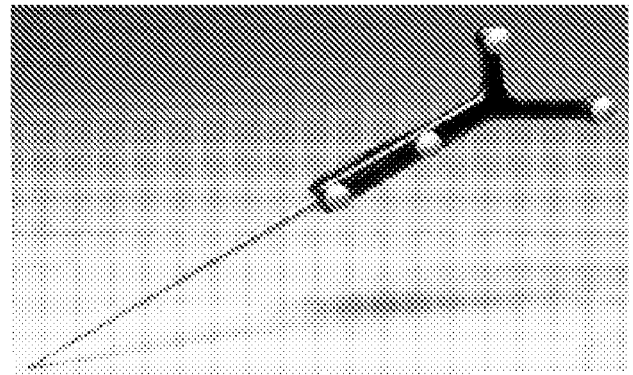
Figure 1d – prior art

| -1 | -2 | -1 |
|----|----|----|
| 0  | 0  | 0  |
| 1  | 2  | 1  |

Figure 4c

METHOD AND SYSTEM FOR THE DETERMINATION OF OBJECT POSITIONS IN A VOLUME

FIELD OF INVENTION

This invention relates to methods and systems for determining the location and/or the orientation of one or more objects in a 3-dimensional (3-d) volume, in which is defined a coordinate system. The methods and systems also relate to distinguishing multiple objects and to determining the location or orientation of one object with respect to another object.

BACKGROUND

Various systems have been constructed which track the location of at least one moveable object in a volume and frequently also track the spatial orientation of the object. The object generally is rigid and is sometimes referred to as a rigid body. Sometimes the moveable but rigid parts of a body are tracked. Tracking an object simply means measuring the 3-d location and/or orientation of the object at least once—but more typically measured frequently and at known instants over a period of time. In some cases, the object is a tool, medical instrument, probe, or pointer, for example. Systems which employ optical means of volumetric tracking typically simplify the task by measuring the location of one or more easily detectable, artificial markers affixed to the object. One kind of typical marker is a energized, point-like light source such as an infrared light emitting diode (LED). This is exemplified by the 3D Creator™ system manufactured by Boulder Innovation Group (Boulder, Colo., USA). Another kind of typical marker is a retro-reflective spot or ball illuminated by a light source typically near each of two or more video cameras, which each stereographically track the centroid of images of each retro-reflective marker. This is exemplified by the Polaris® system made by Northern Digital, Inc. (Waterloo, Ontario, Canada). See FIG. 1a, which is a drawing of an exemplary prior-art system.

An alternative, passive marker is a small high-contrast marker illuminated by ambient lighting, where the marker includes at least one identifiable reference feature point within a recognizable pattern. An example marker is a pattern of alternating adjacent black and white pie-shaped sectors converging on a central saddle point, as described in U.S. Pat. No. 6,978,167. FIG. 1b illustrates an example of such a prior-art marker. Such markers may be tracked stereographically using a system of at least two video cameras, such as the MicronTracker system sold by Claron Technology, Inc. (Toronto, Ontario, Canada).

Whether the marker is an LED, a small retro-reflective spot, a crosshair, or the central vertex of a high contrast pattern, these systems essentially locate or track an individual reference point on the marker. Furthermore, the reference point typically is projected optically onto only a very small region—that is, a few pixels—of the array of image pixels of a video camera or other optical imager. FIG. 1c is an example of an actual image of a retro-reflective ball occupying only a few pixels from a pixel array in a video camera.

To fully track the 3-d orientation of an object therefore requires that at least three such reference point oriented markers be affixed some distance apart from each other in a non-collinear arrangement on the object to be tracked. The space between such prior-art markers remains unused for measurement purposes. Further, distinguishing between two or more objects which each have their own similarly arranged markers may be challenging technically. A common approach is to arrange the markers affixed to one object in a significantly different geometrical pattern from the markers affixed to another object being tracked. For example, the number of markers on one object and/or the distances between the markers may differ from the pattern of another object. An example is the retro-reflective markers on each of the various medical instruments tracked by the VectorVision system of BrainLAB AG (Feldkirchen, Germany). FIG. 1d is a photograph of a typical instrument—a probe pointer in this case—with four non-collinear retro-reflective balls as the markers.

Some prior-art systems which employ actively illuminated markers (such as LEDs or retro-reflective balls) use a scheme of background subtraction. Therein a video frame is acquired and saved at some time when the markers are not illuminated. A video frame herein means the 2-d set of pixel amplitudes output from the pixel array of a camera, which is sometimes also called a raster. That saved video frame is then subtracted—pixel-by-pixel—from a second video frame acquired when the markers are illuminated. The difference between the two frames typically leaves only significant images for the markers, which are then easier to locate and process. Existing known techniques, like background subtraction, may be applied to the present invention but may not otherwise be specifically described herein.

More sophisticated video systems attempt to recognize and track whole objects or complex geometric shapes. This may require complex templates of the object and require correlating a 3-d rotated view of the template with the image of the object. Such systems may require substantial computational resources to perform pattern matching, may be too slow for some real-time applications, or may not satisfy spatial accuracy requirements. An example of such a system was the Eagle Eye® system of Kinetic Sciences Inc. (Vancouver, BC, Canada). Measuring the location or orientation of objects which have no well-defined or artificial markers—such as in tracking vehicles or faces—may be even less reliable and less accurate. Further, it may be nearly impossible to unambiguously determine the orientation of symmetrical or amorphous objects which possess no natural high contrast details or unusual geometrical features to implicitly serve as the equivalent of markers.

SUMMARY OF THE INVENTION

Embodiments described herein employ one or more artificial markers which each comprise a high contrast pattern of two or more stripes. Each stripe forms an image within each of two or more spaced-apart 2-dimensional electronic cameras—thereby forming a stereographic imaging system. In an embodiment, each stripe may form an image which covers more pixels in each camera than would the image of a illuminated LED, a reflective spot or ball, or a small feature-point type marker. In effect, the stripes can utilize the previously unused space which lies between the small point-oriented markers of the aforementioned prior art. Because the edges of the images of the stripes in the cameras may traverse many more pixels than the image of a small marker, a more robust and more precise sub-pixel measurement of the spatial location and orientation of each marker may be possible. Rather than identifying, locating, and measuring any specific marker reference point, an embodiment identifies, locates, and tracks the centerline of each stripe specifically. Alternatively, an embodiment may track the two longitudinal edges of a stripe. If an embodiment does further determine the width, length, endpoints, or center point of a stripe's image, it does so only for ancillary purposes. Ancillary purposes may be to help in associating homologous images of a given stripe in a set of cameras with each other, to help distinguish two stripe images from each other, or to identify a marker comprised of a set of related stripes. In any case, the endpoints, lengths, widths, or other characteristics of the stripes of a marker are not necessarily used to compute the spatial location of a stripe or a marker composed of a plurality of stripes.

Although the stripes may have a more general geometry, a preferred embodiment utilizes relatively narrow, simple stripes having straight edges or a straight centerline. Each such straight-lined stripe in a volume always projects into a straight-lined 2-d stripe image on a video camera's pixel array (after correcting for lens distortion, if any). This is not true of a circular annulus, for example, which when viewed obliquely would have an elliptical image, not a circular image. Nevertheless, the present invention could employ curved stripes of various geometries such as an annulus, but the implementation may be somewhat more complex and more computationally expensive in time or memory without necessarily providing significant advantages.

A system embodiment for determining position information about an object in a volume may include
 a global coordinate system defined in the volume;
 a local coordinate system in a known fixed relationship to the object;
 a pattern of two or more stripes in a fixed relationship to the object, wherein a first stripe of the pattern is characterized by a first reference line known with respect to the local coordinate system, and a second stripe of the pattern is characterized by a second reference line known with respect to the local coordinate system;
 two or more cameras, wherein each camera can output a video frame, and wherein each video frame has a known geometrical relationship to the volume;
 a digital computer adapted to receive the video frame output from each camera; and
 a memory connected to the computer and containing a program of instructions which cause the computer to:
  locate a first set of stripe images of the first stripe, wherein each image in the first set of stripe images is in the video frame output by a camera in a first set of cameras of the two or more cameras,
  locate a second set of stripe images of the second stripe, wherein each image in the second set of stripe images is in the video frame output by a camera in a second set of cameras of the two or more cameras,
  determine, for each image of the first set of stripe images, a first image line in the video frame containing the image, wherein the first image line prescribes a first plane in the volume;
  determine, for each image of the second set of stripe images, a second image line in the video frame containing the image, wherein the second image line prescribes a second plane in the volume;
  compute a first line of intersection of the first planes prescribed by at least two of the first image lines,
  compute a second line of intersection of the second planes prescribed by at least two of the second image lines,
  determine a transformation between the local coordinate system and the global coordinate system, wherein the transformation maps the reference line of the first stripe to the first line of intersection, and wherein the transformation maps the reference line of the second stripe to the second line of intersection, and
  determine from the transformation the position information about the object.

A method for determining positional information about an object in a volume may include
 defining a global coordinate system in the volume;
 defining a local coordinate system in a known fixed relationship to the object;
 affixing a pattern of two or more stripes in a relationship to the object;
 characterizing a first stripe of the pattern by a first reference line with respect to the local coordinate system;
 characterizing a second stripe of the pattern by a second reference line with respect to the local coordinate system;
 positioning two or more cameras to view at least a portion of the volume;
 outputting a video frame from each of the two or more cameras, wherein each video frame has a known geometrical relationship to the volume;
 locating a first set of images of the first stripe, wherein each image in the first set of images is contained in the video frame output by each camera in a first set of cameras of the two or more cameras,
 locating a second set of images of the second stripe, wherein each image in the second set of images is contained in the video frame output by each camera in a second set of cameras of the two or more cameras,
 for each image in the first set of images, determining a first image line in the video frame containing the image, wherein the first image line prescribes a first plane in the volume;
 for each image in the second set of images, determining a second image line in the video frame containing the image, wherein the second image line prescribes a second plane in the volume;
 computing a first line of intersection of the first planes prescribed by at least two of the first image lines;
 computing a second line of intersection of the second planes prescribed by at least two of the second image lines;
 determining a transformation between the local coordinate system and the global coordinate system, wherein the transformation maps the reference line of the first stripe to the first line of intersection, and wherein the transformation maps the reference line of the second stripe to the second line of intersection; and
 determining the position information about the object from the transformation When there are two or more objects being simultaneously tracked in the volume, an embodiment may distinguish the objects by distinguishing the stripe patterns respectively affixed to the objects. For example, each marker may have a unique number, arrangement, or coloration of stripes. The stripes of each marker of multiple markers may be identified or distinguished from each other by some feature or features including the stripes' relative widths, relative lengths, colors, or other visible features. Therefore, the two-dimensional image of each marker may also be identified or distinguished by the projection of such features onto the pixel array of each camera.

When there are two or more objects being tracked in a volume with a global coordinate system, an optional additional step may be performed. Namely, the location and/or orientation of at least one first object may be expressed by a second set of coordinates which are relative to a local coordinate system of a second object. An example is the tracking of the position of a surgical instrument with respect to a patient, who may be moveable within the global coordinate system fixed with respect to the cameras.

Whether an object is tracked with respect to the global coordinate system or with respect to the local coordinate system of a second object, the present system or method embodiment produces position information about the tracked object. The position information may be just the location of the object, just the orientation of the object, or both the location and orientation of the object. Further, the position information may include an indication of the time at which the location and/or position measurement was made. The tracking may be done once or may be performed repeatedly.

DESCRIPTION OF THE DRAWINGS

The accompanying drawings, which are incorporated herein and form a part of the specification, illustrate example embodiments of the present invention and, together with the description, serve to explain the principle of the invention. Wherever possible, the same reference numbers will be used throughout the drawings to refer to the same or like parts.

FIG. 1a is an overall perspective view of an embodiment of a prior-art system, including an object being tracked. FIG. 1b is an example of a prior-art marker. FIG. 1c is an example of an image of a prior-art retro-reflective spherical marker. FIG. 1d is a photograph of a prior-art object (specifically a probe) with four retro-reflective spherical markers.

FIG. 4c is an example of the values in a edge-detecting correlation kernel.

FIG. 6a also includes representations of various relevant coordinate systems.

Figure 2:
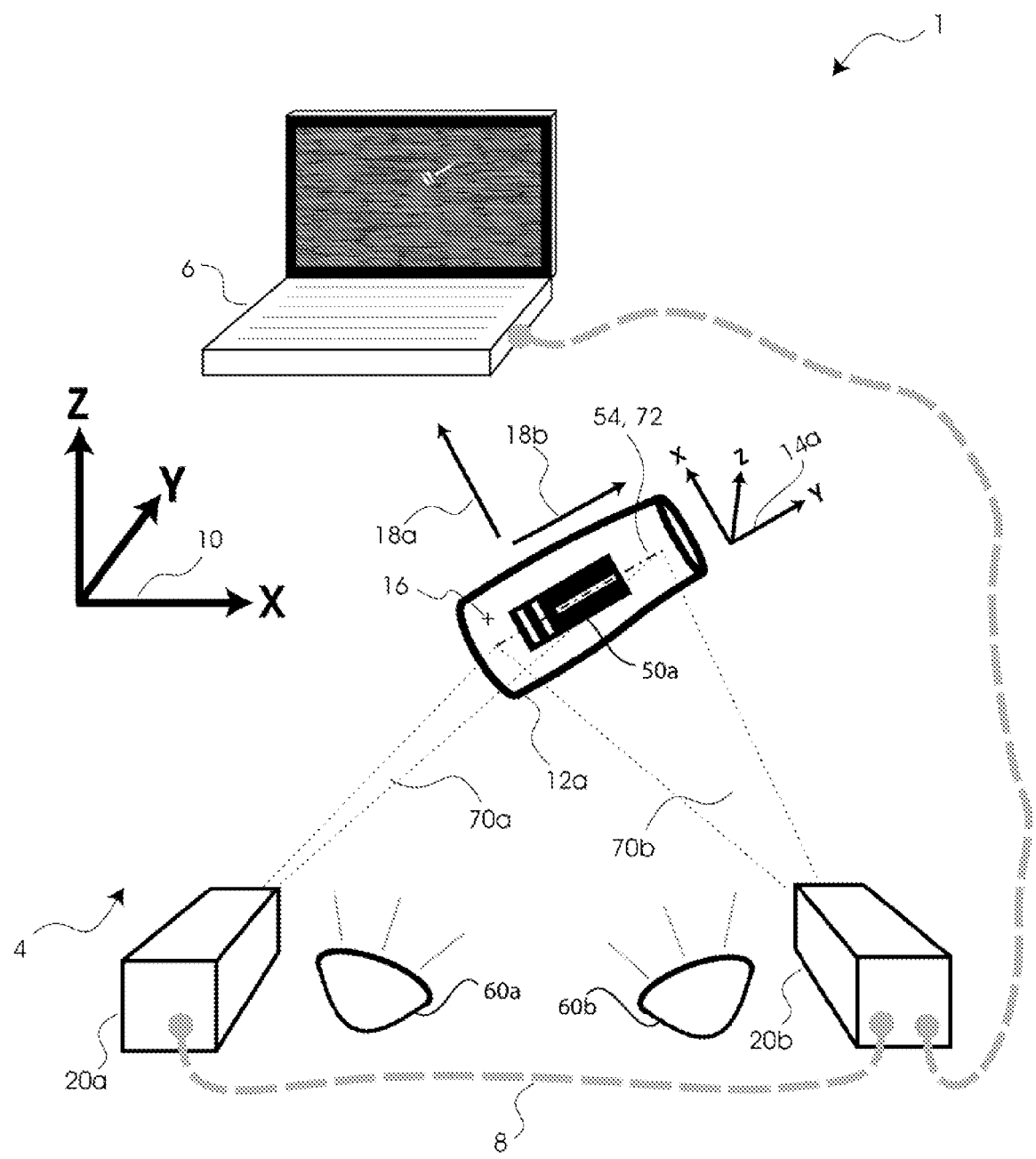
FIG. 2 is an overall perspective view of an embodiment of the invention including an object being tracked.

The numeric identifiers in the figures correspond to the elements of the invention as follows:

1 a 3-d position measuring system
4 a volume
6 a digital computer (such as a laptop personal computer)
8 a control and data path from a camera to computer 6
10 a coordinate system of the volume 4
12a an object to be tracked
12b an optional second object to be tracked
14a,b a local coordinate system of an object
16 a reference point in an object's local coordinate system 14a
18a,b reference vectors in an object's local coordinate system 14a
20a,b two or more cameras (only two are shown)
24 projective point of a camera 20a
26 lines showing the optical projection of a stripe onto an image in the pixel array
30 an array of pixels for a camera 20a
32 perpendicular line from the center of the pixel array 30
34 a lens of a camera
36 optical axis of a camera lens
38 an offset of a lens
40 an example portion of a video frame from a sensor array of pixels
42 an example portion of an image of a light-colored stripe in a frame
44 an example group of contiguous pixels traversing an image of a stripe
46 a centroid point of a run of contiguous pixels
48 the centerline or other image line of an image of a stripe
49a,b image lines of two longitudinal edges of an image of a stripe
50a,b a pattern of two or more stripes
52 a stripe of a pattern of stripes
54 a 3-d reference centerline of a stripe
60a,b a source of light
70a,b a plane prescribed by in image line of a stripe's image in a video frame
72 the line of intersection of the planes prescribed by two or more image lines
100, . . . ,195 steps of an embodiment depicted as a flowchart

DETAILED DESCRIPTION

As used herein, the terms "about" or "approximately" for any numerical values or ranges indicate suitable dimensional tolerances that allow the part or collection of components to function for their intended purposes as described herein.

Herein the "position" of a physical object refers to its 3-dimensional location and/or its 3-dimensional orientation. The following assumes that at least the portion of the physical object is essentially rigid so that the position of that portion can be unambiguously defined. As is common practice in computer science, the location of the object may be represented as the spatial XYZ coordinates of a specified reference point on the object with respect to a rectangular, 3-dimensional global coordinate system defined within a volume in which resides the object. Further, the orientation of the object may be represented by a quaternion; by an axis of rotation and an angle of rotation; by a conventional 3-by-3 rotation matrix; by yaw, pitch, and roll angles with respect to a defined reference orientation; or by the spatial directions of specified reference vectors fixed with respect to the object. As is also common practice, the position—both a location and an orientation—may alternatively be represented by a single 4-by-4 homogeneous coordinate transformation matrix. The homogeneous coordinate transformation matrix may be interpreted to represent the rigid rotation and displacement of an object from a canonical position, such as the position in which a local coordinate system of the object coincides with a global coordinate system.

An object is said to be tracked in a volume if the position of the object is repeatedly measured by a 3-dimensional position measurement system at a frequency sufficient to be useful for a particular application. The position measurement may include some combination of the location of the object, the orientation of the object, the velocity of the object, the rotation of an object, and the time of measurement. The location of the object may be reported as the global 3-d coordinates of a reference point in the local coordinate system of the object—that is, a specified point with respect to the object. One natural, default specified point may be the point located at the origin of the local coordinate system of the object. Alternatively, the location of the object may be represented as a vector displacement of the object from a canonical location for the object. A canonical position for the object may be that position of the object in which its local coordinate system of the object coincides with a fixed global coordinate system.

The orientation of the object may be reported as the direction of at least one reference vector with respect to the global coordinate system or with respect to the local coordinate system of the second object. If no reference vector is specified, the direction of at least one axis (X, Y, or Z) of a local coordinate system may be reported. Alternatively, the orientation of the object may be represented as a rotation of the object with respect to a canonical orientation for the object. For example, a rotation may be represented by a 3-d axis of rotation and an angle of rotation about the axis. Conventionally, when a position is represented by a combination of a vector displacement and a rotation, the rotation is presumed to precede the displacement.

Figure 3:
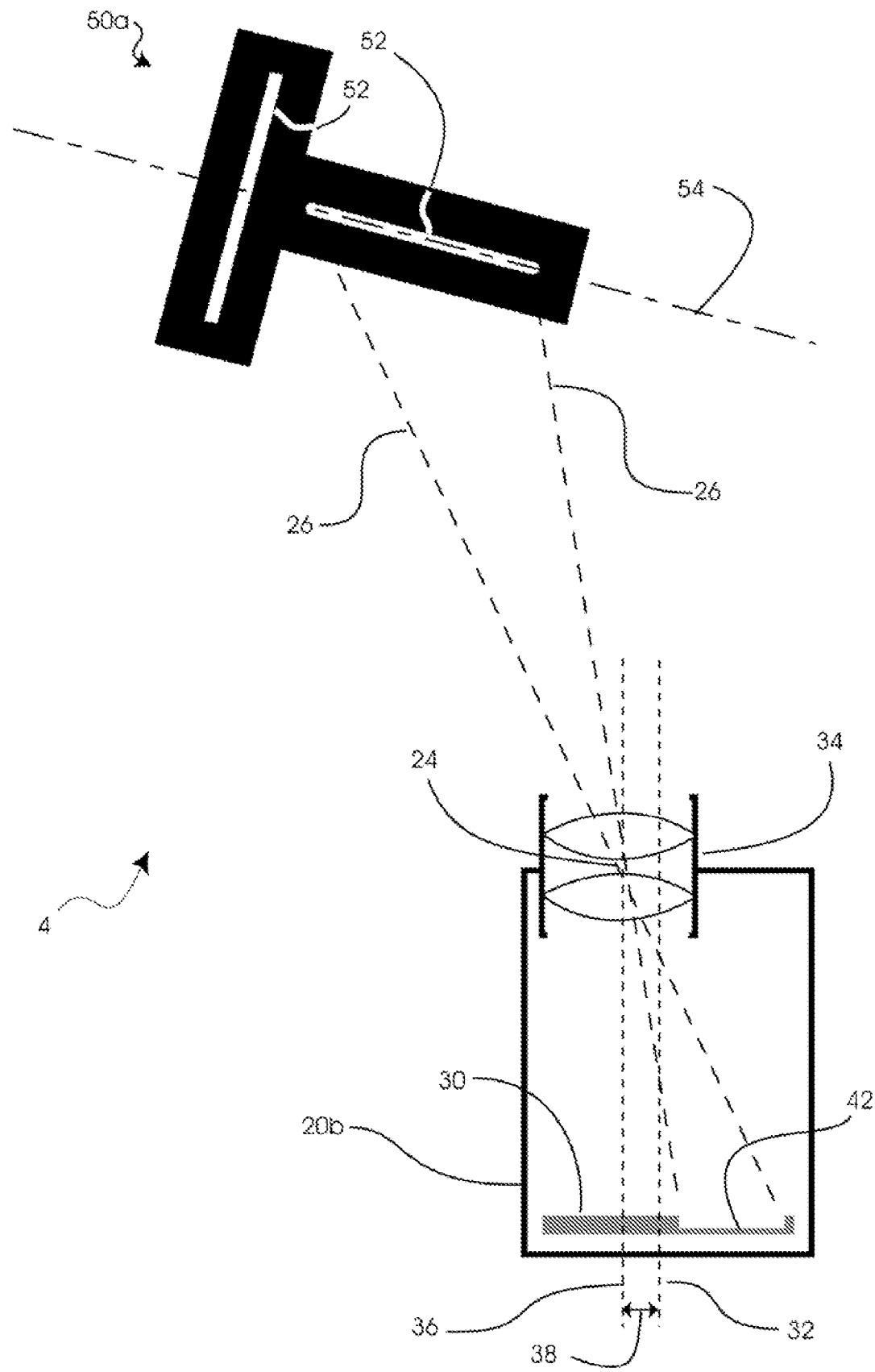
FIG. 3 is cross-sectional diagram of an example digital camera or video camera possessing an offset lens.
Figure 6A:
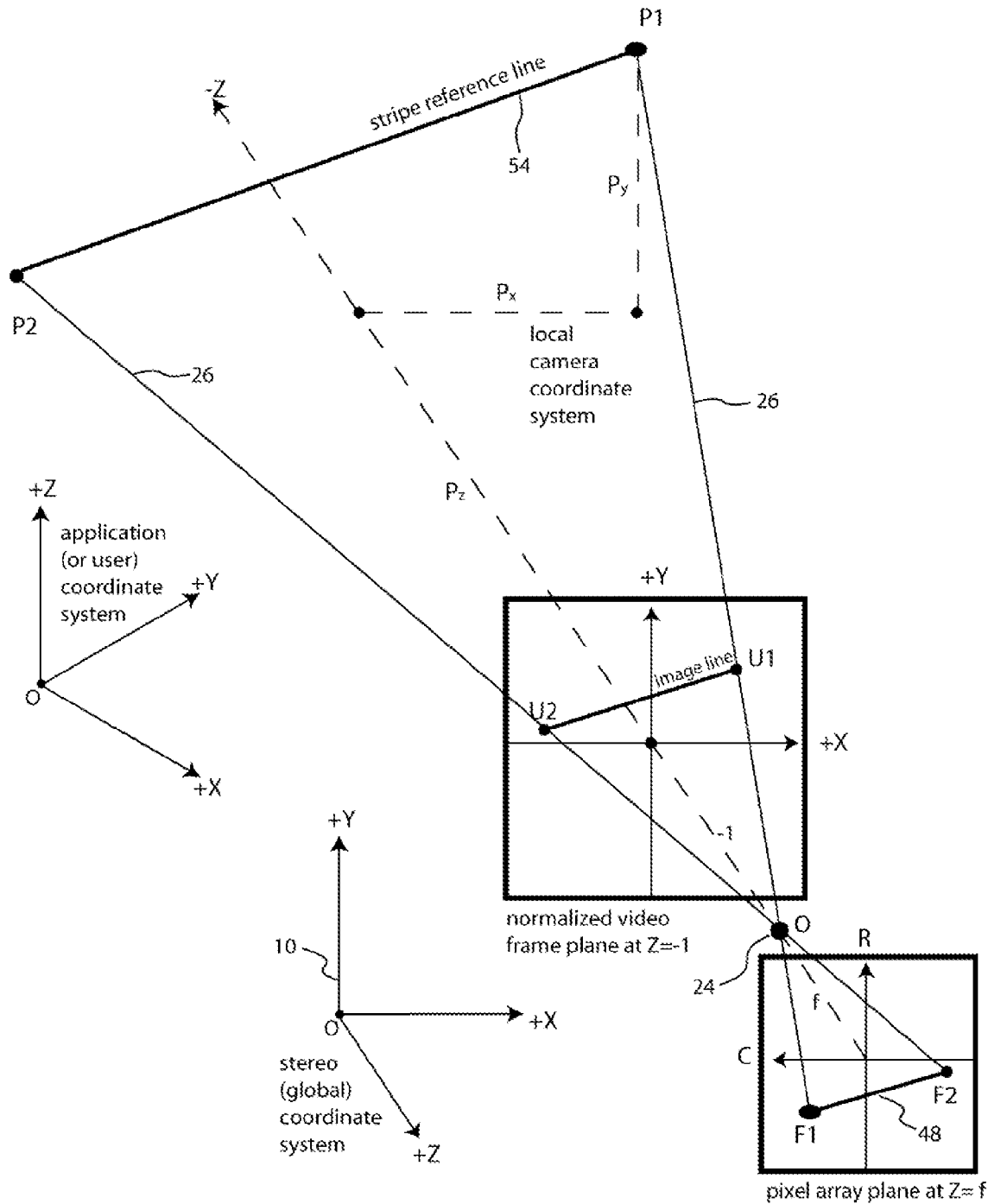
FIG. 6a is a drawing of the 2-dimensional and 3-dimensional geometrical relationships among the 3-dimensional centerline of a stripe, its 2-d image, and its normalized coordinates.
Figure 6B:
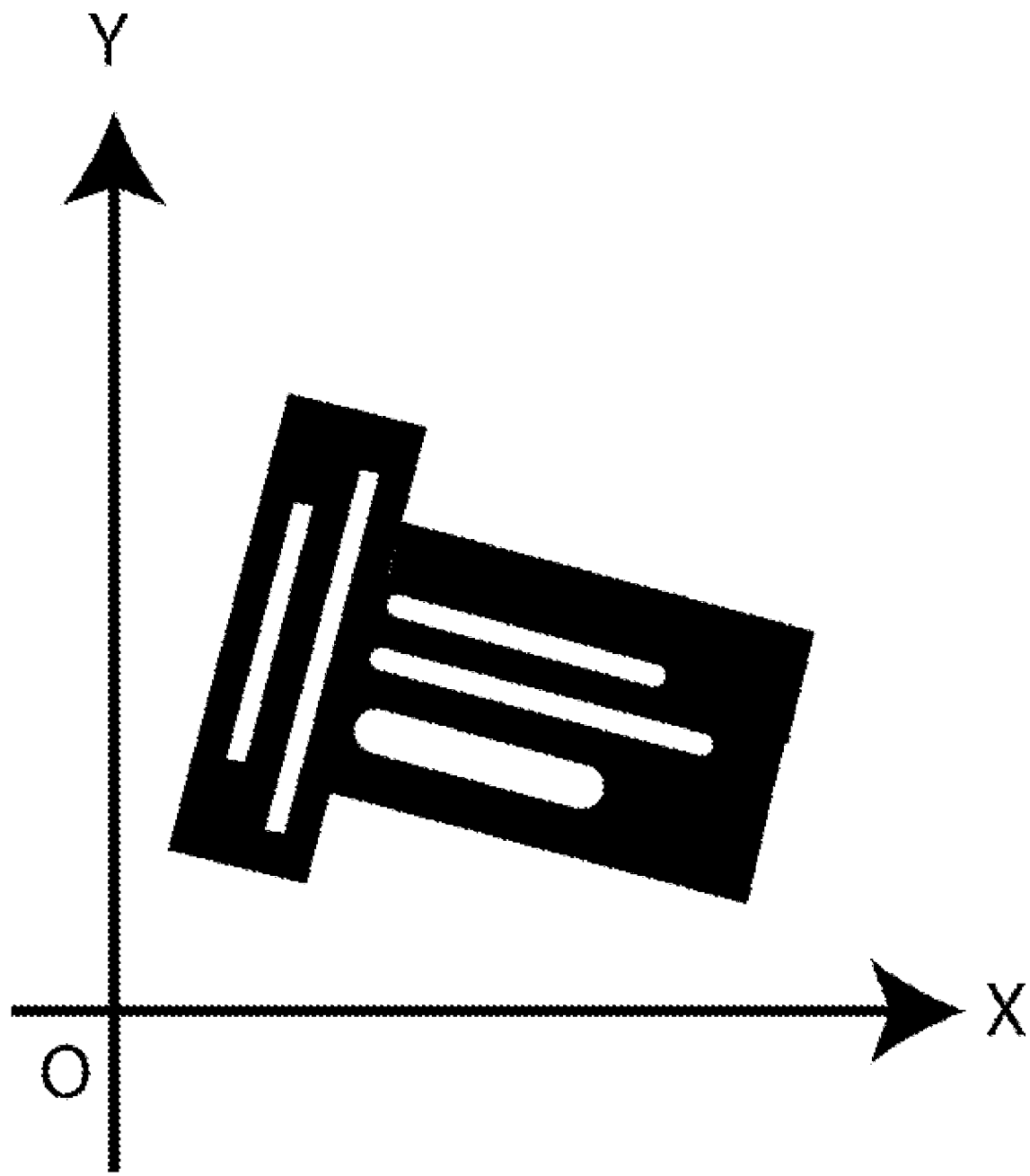
FIG. 6b is a drawing of an example local coordinate system which may be used to describe the geometry of a specific pattern of stripes.

With reference to FIGS. 2 and 3, a system embodiment of a 3-d position measurement system 1 may include a 3-dimensional global coordinate system 10. The global coordinate system is defined in a volume of interest 4 and preferably is a conventional, rectangular (Cartesian) coordinate system having orthogonal X, Y, and Z axes. The units of dimensional measurement may be millimeters or inches, for example. At least one object 12*a* is moveable within the volume 4. Further, a local coordinate system 14*a* is defined with respect to the object 12*a* and fixed relative to the object 12*a*. A reference point 16 and zero or more reference vectors 18*a* and 18*b* may be defined within the object's local coordinate system 14*a*, which can be a conventional, 3-dimensional, rectangular coordinate system having orthogonal X, Y, and Z axes. The coordinates of the reference point 16 with respect to the volume's global coordinate system 10 may be reported as the current, specific location of the object 12*a*, which object otherwise fills many points within the volume. An explicit reference point 16 need not be chosen, because the origin of the local object coordinate system 14*a* may implicitly serve the propose of representing the location of the object 12*a* by default. The object's local coordinate system may be initially defined specifically with respect to the stripe pattern rather than the object to which the pattern is affixed. In this case, the local coordinate system is thereby imposed onto the object when the pattern is affixed to the object. FIG. 6*b* illustrates a local coordinate system defined with respect to a particular planar stripe pattern. The Z axis may be perpendicular to the X and Y axes and stick out from the plane of FIG. 6*b*, which is the Z=0 plane.

With reference to FIG. 2, the directions of the reference vectors 18*a* and 18*b* with respect to the volume's coordinate system 10 may be reported as specifying the orientation of the object 12*a*. The reference vectors 18*a* and 18*b* may conventionally have a length of one unit of distance. An alternative way of specifying the orientation of the object 12*a* is as a conventional rotation matrix or as a quaternion, either of which quantitatively characterizes a spatial, angular rotation of the object about an axis from some standard, canonical, default, or "starting" orientation.

The system 1 also comprises at least two video cameras 20*a*, 20*b*, . . . situated at known locations and at known orientations within the coordinate system 10 of the volume 4. Digital cameras may be used instead of video cameras, if the pixel frames need not be acquired repeatedly and frequently in real time. The locations and orientations of the cameras 20*a,b* may be manually measured with a ruler, level, and protractor or preferably may be determined by an optical calibration procedure. Each camera 20*a,b* is positioned to include at least a portion of the volume of interest 4 in the camera's field of view 22. The location of each camera 20 can conveniently be defined as the location of the effective perspective point 24 of the lens 34, which projects light from the volume 4 onto the focal plane of the camera 20*a,b*. Each lens is hidden and is on the far side of each camera 20*a* or 20*b* as shown in FIG. 2, but the location of each lens 34 is shown in FIG. 3. A 2-d array of photosensitive image pixels 30 resides at the focal plane of each camera 20*a,b*.

The location and orientation of each camera 20*a,b* can be implicitly defined by how the volume's global coordinate system projects points onto the pixel array 30 of the camera 20*a,b*. The projection of points may be represented by a conventional perspective projective transformation matrix. In any case, the calibration of each camera 20*a,b* may be fully described by a set of extrinsic position and intrinsic linearity-correction parameters. Such calibration parameters and a calibration method are described by Roger Tsai in "A Versatile Camera Calibration Technique for High-Accuracy 3D Machine Vision Metrology Using Off-the-Shelf TV Cameras and Lenses", *IEEE Journal of Robotics and Automation*, vol. RA-3, no. 4, August 1987, which is incorporated herein by reference.

The calibration parameters for each camera 20*a,b* effectuate the camera to model an ideal or pin-hole camera—a camera without distortion and with a known geometrical relationship to the volume. Specifically, the relationship may be a 3-d to 2d perspective projection of the volume 4 onto the pixel array 30. The projection may be modeled by the external camera calibration parameters in the form of a projective transformation matrix, commonly used in mathematics and computer graphics. As an intermediate convenience, an individual camera coordinate system may be defined for each camera, as shown in FIG. 6*a*. Ultimately, however, the calibration parameters for all cameras 20*a,b* must be related to the common global coordinate system 10 defined on the volume 4 containing the object 12*a* of interest to be tracked. Then, the video frame data generated by any particular camera's pixel array 30 has a known geometrical relationship to the common global coordinate system 10 of the volume, and thus a location of an image 42 in the video frame 44 also has the same known geometrical relationship to the physical stripe in the volume which generates the image 42. The relationship between an individual camera coordinate system and the common global coordinate system 10 may be specified by a standard linear transformation.

Each camera 20*a* or 20*b* contains an array of pixels 30 which can output data in a sequence of one or more video frames 44. The pixel array 30 may be in the conventional physical form of a 2-dimensional array of discrete photosensitive pixels at the focal plane of each camera 20*a,b*. Herein, the pixel array 30 and the video frame 44 it generates will sometimes be used interchangeably when referring to a stripe image 42 projected onto the pixel array 44 and therefrom generated in a video frame 44. Therefore, the local coordinate system of the pixel array 30 may be assumed to be the coordinate system for the video frame 44 which the pixel array 30 generates.

Each camera 20*a,b* containing the pixel array can output a video frame 44 to the computer 6 over a cable 8 in the form of a conventional serial stream of N-bit pixel values. Each N-bit pixel value represents a numerical amplitude of the light striking an individual pixel on which a tiny portion of the image 42 focused by the lens 34 onto the pixel array 30. The pixel data may be monochrome or comprise three color primary images. Typical values for N range from 8 to 12 bits for monochrome video cameras and 24 bits for color cameras. For example, a video frame 44 output from each camera may be serially transmitted pixel-by-pixel, row-by-row using the conventional IEEE 1394 ("Firewire") standard or USB 2.0 standard. Further, the video frame 44 may be formatted using any of the conventional industrial standard protocols such as IIDC/DCAM, AV/C, or SBP-2. If the video frame 44 data is compressed for transmission, a lossless compression scheme preferably may be employed.

Figure 5A:
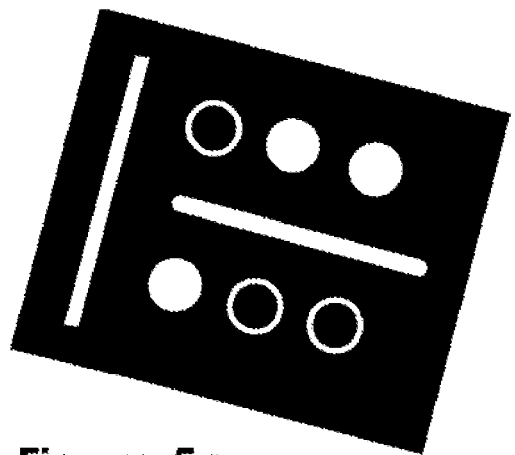
FIGS. 5a through 5f are examples of several possible patterns of stripes, each with features uniquely characterizing the identity of each pattern.
Figure 5B:
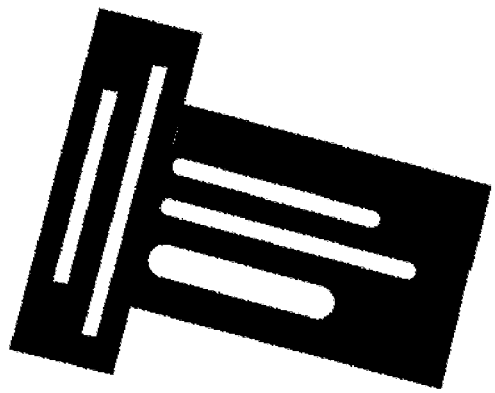
Figure 5C:
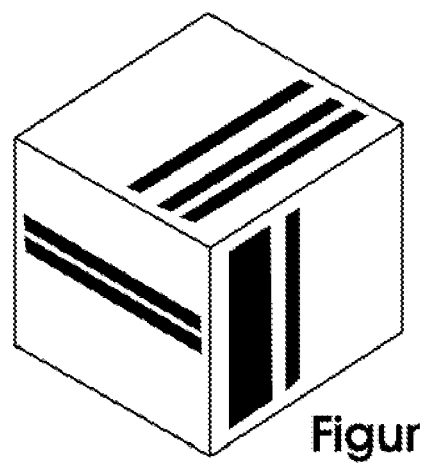
Figure 5D:
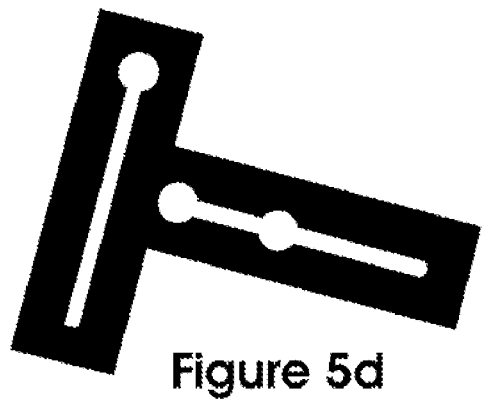

A pattern 50a comprising two or more high-contrast or retro-reflective linear stripes 52 is associated with each moveable object 12a to be tracked. Each stripe 52 is in a known, fixed relationship to the object 12a. For example, the pattern 50a may be a planar pattern adhesively affixed to object 12a. In any case, the pattern preferably is rigid, of known geometry, and is fixed in relation to the local coordinate system 14a which is also defined and fixed with respect to the object 12a. This implies that a centerline 54 and perhaps other geometrical characteristics of interest may be parameterized by constant coordinates with respect to the object's local coordinate system 14a. Instead of centerline 54 or in addition to a centerline 54, one or both longitudinal edges of a stripe 52, or some other reference line can characterize the position of a stripe 52 in the local coordinate system. Other features of a stripe may include color, width, length, or any other specific feature. Such a feature may help uniquely identify or distinguish a given stripe within a pattern 50a or may unambiguously distinguish the identity of each pattern of stripes from any other pattern of stripes in the volume of interest. FIGS. 5a through 5f provide examples of such patterns 50a of stripes with distinguishing features. FIGS. 5a and 5d also include visual non-stripe features that may be useful to an embodiment for uniquely characterizing the identity of the pattern but may not otherwise be used in determining the spatial position of the pattern. While a planar pattern may be convenient, there is no requirement that all the stripes 52 of the pattern be in the same plane. See FIG. 5c for an example of a pattern with stripes in 3 different planes. FIG. 5c is also an example of a pattern of dark stripes on a light background.

While the patterns 50a of stripes 52 are generally and conveniently described herein in terms of straight, flat stripes, a pattern may comprise a set of retro-reflective cylindrical rods arranged in a rigid planar or non-planar configuration. The rods may further be curved or tapered, but to simplify the computations and explanation herein, they will be assumed to be straight cylinders with unambiguous centerlines. The image of each rod in a camera will appear to be similar to the image 42 of a stripe 52 and may therefore be processed in the same manner as the image 42 of a stripe. However, the width of a rod can advantageously remain constant over a wider set of viewing angles than a stripe can.

For simplicity and clarity of description, the following paragraphs will assume that the stripes 52 are white or lightly colored on a black or dark background. This includes retro-reflective stripes or rods having a non-reflective or dark background. An alternative embodiment which images dark stripes on a light background can simply form the negative image of a video frame as a first step and thereafter apply the methods described below. Therefore, stripes might be black on a white field, white on a black field, a color on a complementary background color, or some combination thereof. High contrast or retro-reflective black-and-white stripe patterns may be optimal for monochrome cameras, which typically provide finer resolution, better dynamic range, and higher performance than color cameras.

Linear, elongated stripes or rods are preferred, because their linearity property is invariant with respect to the viewing angle of each camera—unlike the angle or shape characteristics of a circle, an annulus, a checkerboard, or any of many complex geometrical patterns for example. Further, there are well-known computer vision algorithms (such as the Hough transformation) for detecting and finding straight lines in a video image comprising an array of pixels.

Each stripe 52 may preferably be wide enough to be seen by a camera anywhere within the volume 4 even when the plane of the stripe is located at a distance and is oriented at an oblique angle with respect to the line-of-sight to the camera 20a,b—even if the angle is as much as about 45 to 60 degrees with respect to the line-of-sight, for example. Similarly, the space around a stripe and separating two stripes of a pattern 52 may preferably be wide enough that two adjacent stripes can be distinguished from each other even when their common plane is tilted up to about 45 to 60 degrees with respect to each camera. See FIG. 5b, which illustrates an example.

In order to determine the full 3-dimensional orientation of a pattern 50a of stripes and to determine its location both unambiguously and accurately, several conditions may be remembered when designing a pattern 50a. First, in order to avoid orientation ambiguity, the pattern should not have rotational symmetry. For example, two identical parallel stripes or three stripes forming an equilateral triangle would respectively exhibit 180 degree and 120 degree ambiguity. Preferably at least two stripes should form an angle of at least 45 degrees, more preferably closer to 90 degrees. This is because the centerline of each elongate stripe can be precisely determined, but the end points of the stripe cannot be determined precisely and therefore may not be determined at all. The line along which the centerline of a stripe aligns can be determined most accurately. Nevertheless, the relative or approximate length of each stripe may be useful for helping distinguish between two or more stripes and between two or more patterns of stripes. Furthermore, stripes of differing color, width, spacing, relative position, or other geometric feature allow stripes to be unambiguously distinguished from one another. Similarly, if more than one pattern is in the field of view (such as if there are multiple objects to track), stripes differing in these features may be used to form distinct patterns. Distinctive patterns allow the objects to be distinguished from each other. Relative geometrical relationships which are invariant with respect to the viewing angle are most attractive, for example, parallelism, relative lengths of parallel stripes, or color.

Figure 5E:
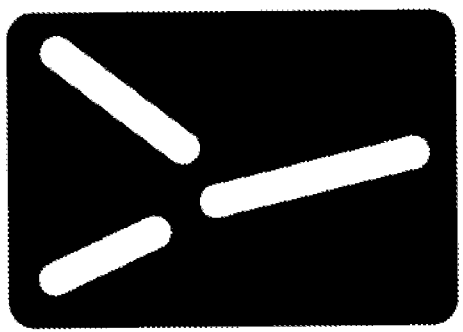
Figure 5F:
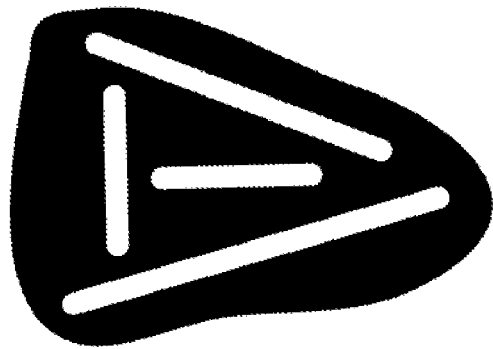

Stripe patterns which are variations and elaborations of a basic "T" shape may present desirable properties for an embodiment. This shape is intended to provide accurate measurement in all directions for all orientations of a pattern. Further, the centerline of one stripe might be situated to always intersect approximately with the midpoint of at least one other stripe in the same plane, for example. Such an arrangement can help identify unambiguously which stripe is which. Additional stripes in the pattern may be parallel to one of those stripes. The additional stripes of various lengths or widths may help insure that the pattern is unique. The additional stripes may contribute further to measurement accuracy. Some inter-stripe relationships may be invariant with respect to the viewing angle and therefore advantageously help identify which stripe images correspond to which stripes within the optically projected 2-dimensional image of the pattern in a video frame of a camera 20a,b. Other stripe patterns can include variations and elaborations of triangles or radial arrangements, as illustrated in FIGS. 5e and 5f. The relative lengths of the stripes, their relative widths, or coloration may be used to distinguish stripe images from each other, to associate stripes images with the stripes of a pattern, and to distinguish images of marker patterns from each other.

An alternative marker design may include, for example, a solid, planar, white-filled triangular area on a contrasting dark background. The edges of the triangle could serve the same purposes as the edges of the stripes described herein. Because of the number of pixels traversed by the edges of the triangle, the triangle may support more accurate localization than a system based on tracking only three point-oriented markers located at the vertices of a triangle of the same size. However, if the solid, white-filled triangular area were replaced with three narrow stripes situated where the sides of the triangle were, the stripes would expose about twice the edge length as the triangular area. That is, all the edges would traverse about twice as many pixels as the edges of the solid filled triangle. Therefore the theoretical inaccuracy would decrease by a factor of about 0.7. Further stripes could be placed inside the triangular arrangement of stripes for further improvement in accuracy. See FIG. 5f. Nevertheless, a pattern including more or less orthogonal and parallel stripes may be preferred in an embodiment, because in general the latter may provide the easiest and most reliable way of distinguishing and identifying images of stripes and patterns thereof.

In order for each video camera 20a,b to capture an image 42 of a stripe pattern 50a as projected onto an array of pixels 40, the stripes 52 must be illuminated—directly or indirectly. There are various choices for illumination. One choice can be natural, ambient illumination such as sunlight or normal room lighting. Another choice can be sources 60a,b of illumination placed near one or more cameras and directed toward the volume 4. A source of illumination at each camera would be especially appropriate for stripe patterns comprising retro-reflective material, such as Scotch® Remote Sensing Sheeting and Tape from the 3M™ Corporation (St. Paul, Minn.). A third choice of lighting can be stripes which are self-illuminated, such as stripe-shaped apertures in an opaque mask over an electroluminescent panel. Similarly, rods may be coated with retro-reflective material or may be translucent rods internally illuminated to glow omni-directionally.

The location of a centerline, an edge line, or some other reference line characterizing a stripe 52 of a stripe pattern 50a in three dimensions may be defined in any convenient way in which any line may be parameterized in analytic geometry. The location of the reference line is defined relative to the local coordinate system which is fixed with respect to the stripe's pattern and the object to which the pattern is affixed. For example, a straight line in either a 2-d or 3-d coordinate system may be parameterized uniquely by the coordinates of each of two spaced-apart points or by a point and a direction vector pointing parallel to the line. However, sometimes it is not advantageous to define a line in terms of one or two specific points, because it may not then be immediately obvious when two lines parameterized by different points are actually the same line. Therefore, in a 2-d coordinate system, such as in the 2-d pixel array or in a video frame generated by the array, a straight line may be parameterized in a canonical way which is independent of an arbitrary, specific point on the line. One way uses a constant D which is the distance from the origin of the coordinate system and a constant unit 2-d vector (A B) which is normal to the line and points from the origin toward the line. The distance D and the normal vector (A B) essentially are the coefficients in the conventional equation of the line. The equation may be written as a 2-d vector dot product:

$$(XY) \cdot (AB) = D$$

In a 3-d coordinate system, a straight line may be specified as the line of intersection of a pair of planes. The equation of each plane i may be parameterized by the constants in a 3-d vector dot product in terms of a constant $D_i$, which is the distance of the plane from the origin, and a constant unit vector $(A_i B_i C_i)$ which is normal to the plane and points away from the origin. Each equation may be written as a 3-d vector dot product:

$$(XYZ) \cdot (A_i B_i C_i) = D_i,$$

where i=1 or i=2, $A_i^2 + B_i^2 + C_i^2 = 1$, and $D_i \geq 0$.

A point (X Y Z) on the line of intersection satisfies both vector equations simultaneously. Of course, the two planes must be chosen to be neither parallel nor co-planar, so that a line of intersection exists. Preferably the two planes should form a dihedral angle as close to a right angle as practical.

Because any of an infinite number of planes can intersect along the same line of intersection, it may be advantageous to choose a canonical pair of planes to represent the line of intersection. For example, both planes of the canonical pair contain the line of intersection, but the first plane V is parallel to the Z-axis and the second plane P is perpendicular to first plane V. Alternative choices for a canonical pair may be used instead. Given the equations of two non-parallel, non-coplanar 3-d planes as above, the canonical pair of planes may be computed as follows. Plane V is defined by the equation $$(XYZ) \cdot (A_V B_V C_V) = D_V,$$

where, if $C_2 \neq 0$ $$(A_V B_V C_V) = (A_1 B_1 C_1) - (C_1/C_2) \cdot (A_2 B_2 C_2) \text{ and}$$

$$D_V = D_1 - (C_1/C_2) \cdot D_2.$$

If $C_2 = 0$, then set plane V equal to plane 2. Plane P may be defined by the equation $$(XYZ) \cdot (A_P B_P C_P) = D_P,$$

where $$(A_P B_P C_P) = L \times (A_V B_V C_V)$$

$$L = (A_1 B_1 C_1) \cdot \times (A_2 B_2 C_2)/(A_1^2 + B_1^2 + C_1^2)/(A_2^2 + B_2^2 + C_2^2)$$

$$D_P = (A_P B_P C_P) \cdot (X_L Y_L Z_L) \text{ for any point } (X_L Y_L Z_L) \text{ on the line of intersection.}$$

Figure 4A:
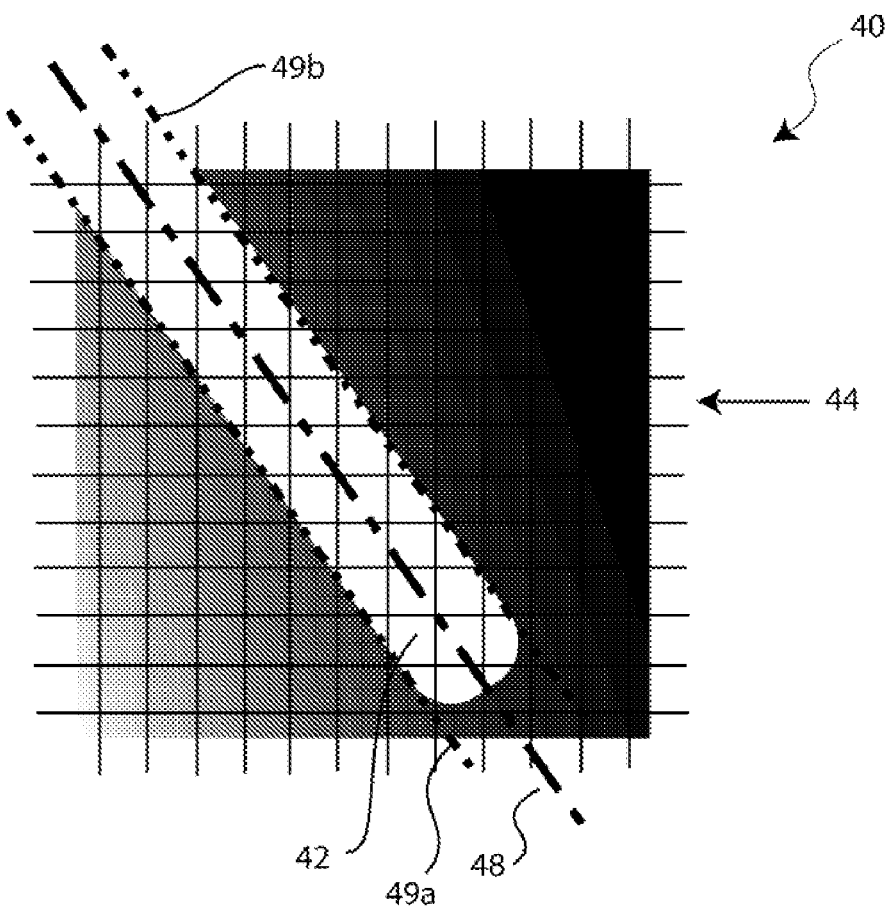
FIG. 4a is an example of a portion of the pixels of one camera's pixel array with an image of a portion of a white stripe.

FIG. 4a depicts an example of part of the image 42 of a white stripe on a dark background. The image 42 is a projection onto a pixel array 40 of a camera 20a,b, part of which is shown in FIG. 4a. Because the stripe is straight, its stripe image 42 is also straight and therefore has a straight centerline 48, as well as straight edge lines 49a,b. It may be necessary to first correct the image 42 for any optical lens distortion, such as by applying the techniques described by the Tsai paper incorporated herein. Assuming that the image 42 is well focused, then the edges 49a and 49b of the image 42 may also be well-defined.

Figure 4B:
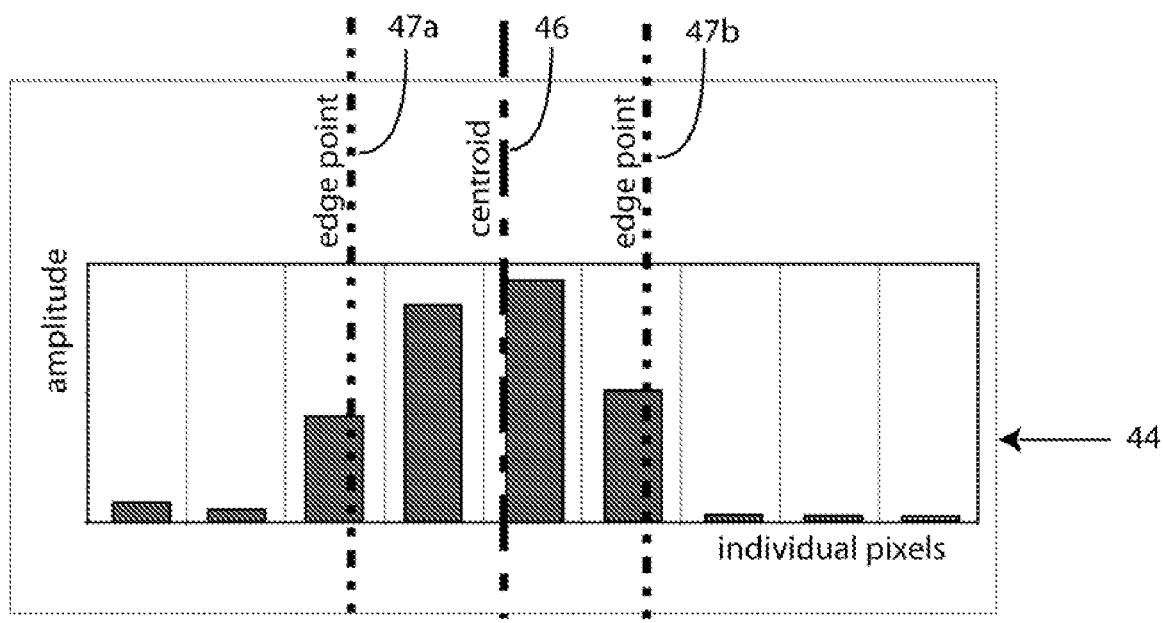
FIG. 4b is a graph of the amplitudes of nine contiguous pixels in a row which horizontally traverses the image of a stripe.

FIG. 4b depicts an example of the pixel amplitudes (that is, brightness) for nine pixels of row 44 approximately centered on the image 42 of FIG. 4a. Ideally, the amplitude-weighted average, or centroid, 46 of these nine pixels will lie on the centerline 48 where the center of row 44 crosses the image 42. By finding similar centroids 46 in all the pixel array rows and/or columns which traverse the image 42, many points on the centerline can be estimated. The exact number of pixels used to compute each centroid will depend on the width of the image 42 of the stripe. The pixels used for each centroid should be contiguous, in a line, minimally but fully span the whole image 42, and include the pixels just past the edge of the stripe image 42 on each side approximating a point on the centerline. Note that each computed centroid will result in sub-pixel coordinates. For a horizontal run of N pixels, the centroid in row R will have the coordinates (X, $Y_R$), where $$X = (\Sigma_i X_i * A_i)/(\Sigma_i A_i) \text{ for } i = m_{mL} \ldots m_R,$$

$Y_R$ is the vertical coordinate for the center of row R in the pixel array, $m_L$ and $m_R$ are the indices of pixels immediately left and right the image 42 in row R, $A_i$ is the amplitude of the pixel with index i in row R, and $X_i$ is the horizontal coordinate of the center of the pixel with index i.

A centroid for column C will have the coordinates ($X_C$, Y), where $$Y = (\Sigma_i Y_i * A_i)/(\Sigma_i A_i) \text{ for } i = m_A \ldots m_B,$$

$X_C$ is the horizontal coordinate for the center of pixel p in column C in the pixel array, $m_A$ and $m_B$ are the indices of pixels immediately above and below the image 42 in column C, $A_i$ is the amplitude of the pixel with index i in column C, and $Y_i$ is the vertical coordinate of the center of the pixel with index i.

In the above formulas, the coordinates $X_C$, $Y_R$, $X_i$, and $Y_i$ may be the coordinates of the pixels after being corrected for lens distortion by applying the principles of Tsai paper incorporated herein.

Note that for images which are closest to being parallel to a row of pixels, the centroid computation may use just a columnar run of consecutive pixels crossing image 42. For images which are closest to being parallel to a column of pixels, the centroid computation may just use row-oriented run of consecutive pixels. For images that are closer to a diagonal (such as in FIG. 4*a*), either a run of columnar pixels or a run of row-oriented pixels or both may be used to estimate points on the centerline.

In an enhanced alternative embodiment, centroid formulas similar to the above may be optionally derived for diagonal runs of pixels. That is, for stripe images with centerlines far from both horizontal and vertical, a diagonal run of consecutive pixels may be used which consists of those pixels lying along a 45-degree line of pixels in the pixel array and which span the image 42.

In yet another alternative embodiment, square patches of adjacent pixels, such as a N by N blocks centered on various locations along the image 42, may be used to compute a set of 2-d centroid points, regardless of the angle of the image 42. The value of N may need to be slightly larger than the width of the image 42 in pixels, and the patch may be centered on the brightest pixels along the stripe image 42.

The centroid computations may be initiated on a row or column containing one of the brightest pixels of a stripe image 42. From there, centroids of the immediately adjacent cross-sectional rows or columns may be computed, then continuing in both directions along the stripe image 42 until the ends of the image 42 are reached. It may be assumed that each end of the stripe image 42 is reached when the maximum pixel amplitude in the currently processed cross-section drops below a certain threshold compared to the mean amplitude of the cross-sections, for example.

Once the centroid points (X, $Y_R$) and/or ($X_C$, Y) of sufficiently many cross-sections have been computed for a particular stripe image 42, then the stripe image centerline 48 is determined. Preferably centroid points are computed for every row or column which traverses the particular stripe image 42. The centerline 48 is understood to be an image line which most closely fits the set of the centroid points. A standard linear regression calculation may be used to compute the constants which parameterize such a best-fit image line and which characterize the centerline of the stripe image 42. Within the regression calculation, each centroid point itself may be weighted by the total intensity of the pixels from which the centroid was computed.

Figure 4C:
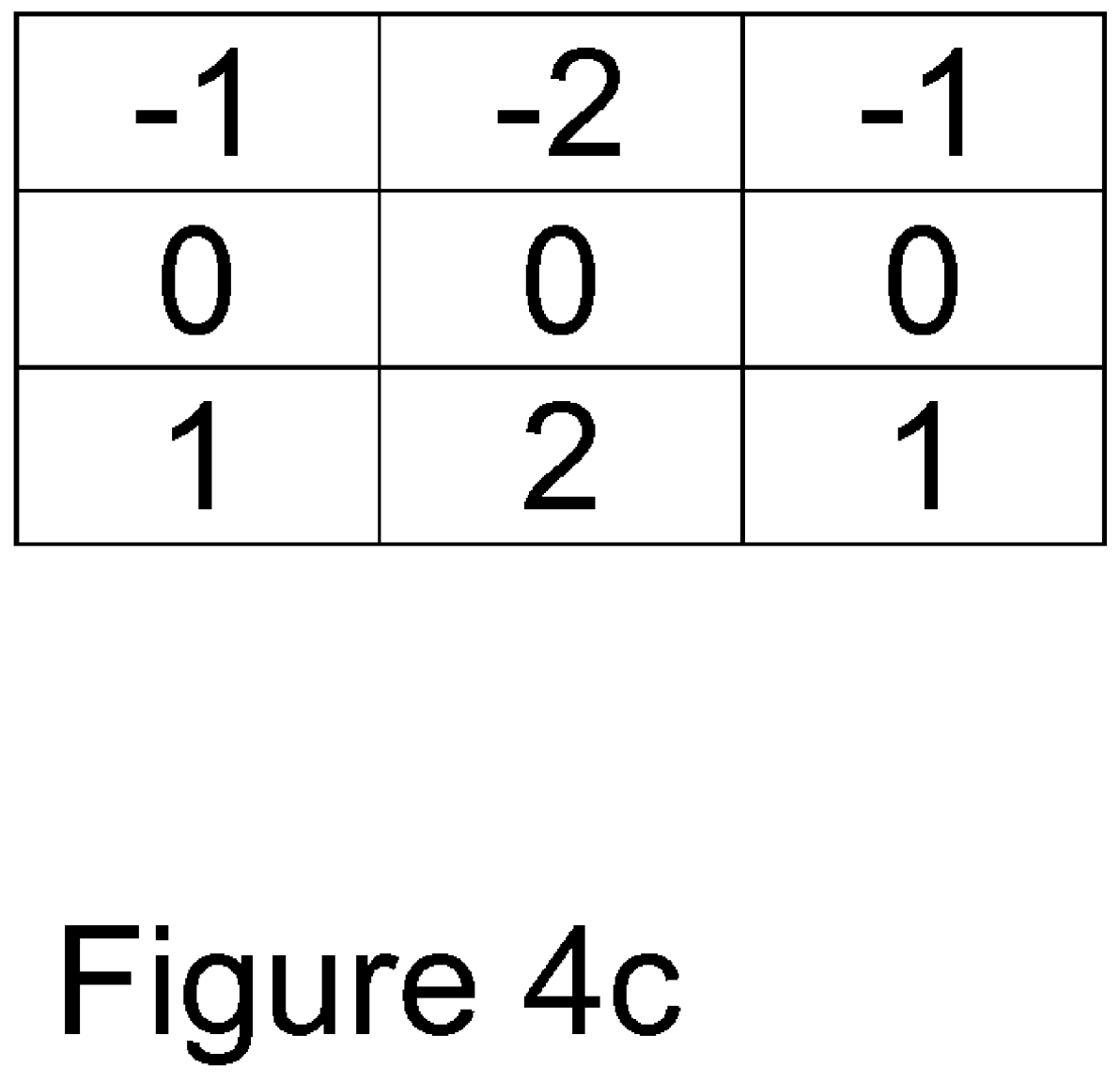

An alternative to determining the centerline 48 of a stripe's image 42 involves detecting the straight, longitudinal edges 49*a* and 49*b* of the image 42 and determining an image line characterizing each edge 49*a,b* of the stripe image 42. Standard computer image processing techniques may be used to find and precisely locate edge points along the high-contrast stripe images in a pixel array. An example technique is the Sobel correlation kernel, which computes a discrete estimate of the gradient of the image intensity at each pixel. For example, FIG. 4*c* includes an example of a 3-by-3 Sobel edge-detection correlation kernel to estimate the vertical component of the amplitude gradients in a pixel array. The application of correlation kernels to pixel arrays is well-known in the art of image processing. The magnitude of the gradient will be largest at the edge. The short transverse edges at the end of the stripe's image 42 may be ignored for measurement purposes, because they may be indistinct or rounded as in FIG. 4*a* and may at most contribute very little to the positional information. Centroid computations similar to those above used to estimate the centerline may be applied to the gradients to estimate points where the gradient is maximum and thus to estimate points on the edge. The best-fit regression line through a set of such edge points may be taken as an estimate of the location of the edge on a pixel array.

Another method of determining where an edge line of the image 42 crosses a row or column 44, is to fit a continuous mathematical function to the pixel intensities of several consecutive pixels within a row or column which span the edge of an image 42. For example, the function may be a cubic polynomial, a rational polynomial, or a function including a hyperbolic tangent term. Then the sub-pixel coordinate 47*a* or 47*b* is computed where the absolute value of the derivative of the continuous function is maximal within the row or column on which the function is defined. With reference to FIGS. 4*a* and 4*b*, that sub-pixel coordinate 47*a* or 47*b* within the row or column 44 may be assumed to lie on edge 49*a* or 49*b* respectively. Using a continuous mathematical function to approximate an edge point may be particularly useful where a blurry, indistinct edge covers more than just 2 or 3 pixels. This process of estimating the location of an edge point may be repeated for all rows or columns which intersect each longitudinal edge 49*a,b* of the image 42. For each edge 49*a* or 49*b* of a given stripe image 42, use a technique like linear regression to estimate a 2-dimensional image line within the pixel array which a best fit to all the estimated sub-pixel coordinates 47*a* or 47*b* along each edge. The technique determines constants which parameterize each of two 2-d image lines characterizing the two edges of the stripe image 42.

The 2-d centerline of the stripe image 42 may be taken to be the image line lying exactly between the two 2-d image lines determined to characterize both longitudinal edges of the stripe image 42. Edge lines and/or centerlines are the obvious choices for image lines which characterize an image 42, and are lines readily derivable from the image 42 of a stripe in a stripe pattern. Other choices for image lines may be useful and may be used by the methods and systems described herein. An example is the bisector of the angle formed by the two centerlines of two non-parallel straight stripes or the line midway between two parallel stripes. Nevertheless, the choice for an image line relates to the choice of a reference line to characterize the stripe which generates the image 42 from which the image line is derived. For simplicity and clarity, the description herein will assume that the 2-d image line in a video frame literally is the projection of the reference line of the stripe. Other relationships are possible between image lines and reference lines in a pattern, such as the two image lines of the edges of a 2-d image of a rod, which is characterized by a 3-d reference centerline.

Especially if a stripe image 42 is well-focused, determining the longitudinal edges of a stripe may be advantageous over directly estimating the centerline points from centroids, because most of the significant localization information is concentrated in the edge gradients, not in the amplitudes of the pixels within the stripe image 42. This is especially the case when the image is many pixels wide. Nevertheless, estimating two edge lines using the per-row or per-column continuous functions described above may be more computationally expensive than estimating the centerline directly from amplitude centroids.

If either of a stripe's longitudinal edges traverses sufficient pixels, say more than 50 pixels, for example, then accuracy requirements of the estimated coordinates of individual edge points may be relaxed somewhat for the sake of reducing computation time. This is because in general the linear regression calculation will statistically average out the subpixel discrepancies to produce a faster, but still reasonably exact, image line estimation for each edge 49a and 49b or similarly for the centerline 48. For a stripe image 42 that is more vertical than horizontal, for instance, an edge coordinate (X, $Y_R$) may roughly be estimated using only three consecutive pixels in row R of a video pixel array, as follows:

$$X = X_p + \Delta X (d_{-1} - d_1)/(d_{-1} + d_1)/2,$$

where
$d_{-1} = |A_p - A_{p-1}|$ is a discrete estimate of the amplitude gradient between pixels p−1 and p,
$d_1 = |A_{p+1} - A_p|$ is a discrete estimate of the amplitude gradient between pixels p and p+1,
$Y_R$ is the vertical coordinate for the center of pixel p in row R in the pixel array,
$A_i$ is the amplitude of the pixel with index p in row R,
$X_p$ is the horizontal coordinate of the center of pixel p,
$\Delta X$ is the width of a pixel in pixel array coordinate units,
p is the index of a pixel in row R in the image 42 with the largest differential, $|A_{p+1} - A_{p-1}|$.
In the above, X is simply a quick linear interpolation estimate of where the edge lies. The values of $d_{-1}$ and $d_1$ may be the results computed by applying a Sobel operator or some other correlation kernel. Pixel p is chosen where $|A_{p+1} - A_{p-1}|$ is greatest.

A computation similar to the above applies for finding an edge line point within column C of a video pixel array for a stripe image 42 that is more horizontal than vertical: simply interchange row R with column C, and interchange X with Y.

Similarly, a rough estimation to the centerline point along a row or column cross-section of an image 42 may simply use the average of the approximated coordinates of each of the two opposite edge points lying in the same row R or in the same column C respectively. With a sufficient number of cross-sectional rows or columns, such as more than 50, a reasonably accurate approximation to the centerline of the whole stripe may be rapidly computed.

The emphasis specifically on detecting edge points and representing image edges with image lines is based on the observation that the precise location of a stripe image 42 in a pixel array is mostly determined by the amplitudes of the pixels on which the edge of a stripe image 42 falls. For example, in row 44 of FIGS. 4a and 4b, two pixels are almost entirely within the stripe image 42 and have about the same, maximal amplitude. However, the edges of the image 42 more or less fall within two pixels. The amount by which one edge falls within a pixel is reflected in the output amplitude of that pixel, which roughly indicates the subpixel location within the pixel where the edge falls. Such information is not reflected by pixels wholly inside the stripe image 42 or wholly outside the stripe image 42. These observations apply even more so to wider stripe images which cover more pixels of a row than illustrated in FIG. 4a. Similarly, these observations apply when an image edge falls on several consecutive pixels—that is, when the image edge is blurrier or less well-defined than illustrated in FIG. 4a.

The preceding formula for the estimated X coordinate of an edge point within a row R or within a column C took into account only three pixels' amplitudes. A slower, but more general estimation of the subpixel location of a point 47a,b on the edge—especially when the edge is blurrier—can involve N consecutive (row or column) pixels minimally but completely spanning an edge of the stripe image 42. A more generalized formula for estimating a point (X, $Y_R$) within row R on an edge of a more vertical stripe image 42 may involve finding the centroid of the amplitude differences between adjacent pixels of N pixels spanning the edge of the image 42:

$$X = X_p + \Delta X \cdot \left( \sum_i d_i \cdot (i + i - 1)/2 \right) \Big/ \left( \sum_i d_i \right)$$

where i=0, . . . , N−1,
$d_i = |A_{p+i} - A_{p+i-1}|$ is a discrete estimate of the amplitude gradient between 2 pixels,
$Y_R$ is the vertical coordinate for the center of pixel p in row R in the pixel array,
$A_p$ is the amplitude of the pixel with index p in row R,
$X_p$ is the horizontal coordinate of the center of pixel p,
$\Delta X$ is the width of a pixel in pixel array coordinate units,
p is the index of the first of N consecutive pixels in row R in the image 42.

A similar formula applies to stripe images which are mostly horizontal in the pixel array and computes edge points ($X_C$, Y) in each column C intersecting the stripe image 42:

$$Y = Y_p + \Delta Y \cdot \left( \sum_i d_i \cdot (i + i - 1)/2 \right) \Big/ \left( \sum_i d_i \right)$$

where i=0, . . . , N−1,
$d_i = |A_{p+i} - A_{p+i-1}|$ is a discrete estimate of the amplitude gradient between 2 pixels,
$X_C$ is the horizontal coordinate for the center of pixel p in column C in the pixel array,
$A_p$ is the amplitude of the pixel with index p in column C,
$Y_p$ is the vertical coordinate of the center of pixel p,
$\Delta Y$ is the height of a pixel in pixel array coordinate units,
p is the index of the first of N consecutive pixels in column C in the image 42.

For each row traversing a mostly vertical stripe image 42, choose p and N so that one end of the N consecutive pixels lies just fully outside the image 42, the other end lies just fully inside the image 42, and N is as small as possible. That is, choose p and N so that $d_0$ and $d_{N-1}$ are small compared to the values of $d_i$ of pixels between the end pixels of the N consecutive pixels. Similarly, for each column containing a mostly horizontal stripe image 42, choose p and N so that one end of the consecutive pixels lies just outside the image 42, the other end lies just inside the image 42, and N is as small as possible. For a mostly diagonal stripe image 42, either or both of the above formulas may be applied to rows and/or columns crossing the edges of the stripe image 42.

In general, the values of $A_{p+i}-A_{p+i-1}$ will be non-negative for consecutive pixels spanning one edge of a stripe image 42, and the values of $A_{p+i}-A_{p+i-1}$ will be non-positive for consecutive pixels spanning the opposite edge of the same stripe image 42. For example, in the above formulas, the values of $A_{p+i}-A_{p+i-1}$ will be non-negative for the left edge of a mostly vertical image 42 of a white stripe on a dark background. If these conditions are not true, then N is probably too large, and a smaller value of N should be used instead.

Each of the two edge image lines 49a,49b characterizing the longitudinal edges of each stripe image 42 may be used instead of or in addition to the centerline 48 wherever the image centerline 48 is referred to in this description. In a preferred embodiment, the centerline may be computed as the mid-line between the two lines 49a,49b representing the longitudinal edges of a stripe image 42. Because the edge lines may be parallel or nearly so, a quick way to determine the constants which parameterize the centerline is to simply compute the mean of each of the corresponding constants which parameterize the two edge image lines 49a,b. In other words, add together the equations which specify each edge image line 49a,b to get the equation of the centerline 48. For the reasons given previously, this alternative method of computing the centerline 48 may be preferable to a centerline computed as the regression line of the centroid points computed directly from the pixel amplitudes. This is because the latter method may assign too much weight to the high-amplitude pixels interior to the stripe image 42, which pixels contribute little or no significant information to the estimation of the subpixel coordinates of the centerline.

An image line may be computed for each stripe image 42 in a video frame from each camera. The image line may prescribe a 3-d plane which contains the reference line characterizing the stripe generating the image 42 for the current position of the stripe 52 in the volume 4. Such an image line is depicted in FIG. 6a. However, the exact location of the reference line within the prescribed plane is ambiguous. This is because of the optical 3-d to 2-d projection of the 3-d volume onto the 2-d pixel array—and therefore onto the 2-d video frame the array generates. However, a corresponding plane may be prescribed by the image line of a corresponding stripe image 42 of the same stripe in a different camera. In general, the two planes will intersect along a unique 3-d line in the volume. The pathological case when the two planes coincide will be discussed later. The case of the two planes being parallel may indicate a calibration error. If there is a set of more than two cameras whose pixel arrays generated video frames containing images of the same stripe, then each of those additional prescribed planes will also intersect approximately along the same 3-d line of intersection.

In practice, a set of three or more such planes will not all exactly intersect along the same line of intersection. Therefore, an embodiment may choose the 3-d line of intersection of two particular planes in the set, such as the pair of planes which intersect at a dihedral angle closest to a right angle. Alternatively, an embodiment may compute a line of intersection which is the average of all the lines of intersection formed by various pairs of planes in the set of planes which are prescribed by the image lines of all stripe images of a stripe. In effect this is equivalent to finding the best-fit solution to an over-determined set of linear equations. The various planes may be parameterized with respect to a common coordinate system, specifically the global coordinate system 10, before computing the line of intersection. The line of intersection may be represented in any of the previously described ways or any other equivalent way.

Initially in determining a plane prescribed by an image line, the prescribed plane may be parameterized by constants with respect to the individual camera coordinate system for the camera producing the video frame containing the image line. This may be because the prescribed plane may be derived directly from the image line, which may be parameterized in terms of the video frame's 2-d coordinate system which is related to the 3-d individual camera coordinate system. See FIG. 6a. In that case, a straightforward linear transformation can be used to map the constants which parameterize the plane with respect to the individual camera coordinate system to produce new constants which parameterize the plane with respect to the global coordinate system 10. The transformation is part of—or is directly deraved from—the camera's extrinsic calibration parameters. To compute the line of intersection between a pair of planes, insure that both planes are parameterized with respect to the same coordinate system, such as the global coordinate system 10. The line of intersection may be represented by a canonical pair of planes, for example, as described herein. This may be useful in quickly determining whether two pairs of planes share a common line of intersection—or almost the same line of intersection. The global coordinate system in an embodiment may be chosen to be the coordinate system of one particular camera in the embodiment by default, if there is no other rationale for defining the global coordinate system differently.

The result of the calibration for each camera in effect provides a best-fit linear projection which relates a set of stripe reference lines at known spatial locations and orientations with corresponding stripe image lines on the camera's pixel array. Conversely, the projection relates any stripe image line in a given camera to a unique plane in which the reference line of the stripe itself occupies in the volume. (The reference line may be the centerline 54 of the stripe. Given such planes for a set of two or more cameras, the line of intersection of the planes may be assumed to be the projection of the centerline 54 of the stripe itself for the current position of the stripe in the volume's global coordinate system.

To help associate the stripe images in a set of cameras which are the set of images of the same stripe, the approximate endpoints of the stripe images may be projected back out into the volume for each camera, as shown in FIG. 6a. The projections of the points back out into the volume will be lines 26. A line 26 from each endpoint F1,F2 of a given stripe image 42 in each camera should approximately intersect the corresponding line projected from the corresponding endpoint F1,F2 of the corresponding stripe image 42 in any other camera. If not, the stripe images may be assumed to be generated by different stripes. The set of images of the same stripe is called the set of homologous images of the stripe. The set of cameras having a homologous stripe image of a given stripe may be less than all the cameras, but at least two cameras must have a homologous image in order to determine the current location of the reference line of the stripe.

There can be optimizations to speed up finding the associations among the set of homologous images, such as consulting image matches of previous, recently processed video frames. Nevertheless, a brute force comparison trying all possible combinations of images can eventually associate the stripe images from all cameras' video frames which are images of the same stripe. Given a set of homologous stripe images, the intersection of the planes prescribed by the image lines of the stripe images, as described above, becomes the line of intersection computed relative to the volume's global coordinate system 10. The above associating of images may be repeated for some or all of the other homologous stripe images in the set of video images of at least two cameras.

Furthermore, it may be possible to identify stripe images within a video frame as being images of specific stripes in a particular pattern of stripes affixed to an object. An embodiment may perform this identification in a brute force method simply by testing all possible combinations of stripe images to identify which images are images of which particular stripes of a particular stripe pattern. Because the number of combinations may be large even for very few stripe patterns in the volume, optimizations to quickly cull out the likely combinations may speed up the identification. One optimization is to quickly eliminate combinations of stripe images which are obviously not a set of homologous stripe images. For example, widely spaced-apart stripe images cannot be images of stripes from the same pattern of stripes. Generally, very closely spaced stripe images may be images of stripes from the same stripe pattern. Parallel stripe images cannot be images of stripes which are not parallel in the stripe pattern forming the images. Parallelism may be quickly checked by comparing the parameters of the image lines of two stripe images. Image lines of two stripe images which intersect within one of the stripe images generally reflect the corresponding situation for the reference lines of the corresponding stripes which generate the images—at least for two stripes in the same plane. For example, in a pattern, if one stripe's centerline bisects a second stripe, that condition will be imitated in the images of the stripes in a camera's video image.

Further tests like the above may be part of the optimization within an embodiment. For embodiments which track the position of one or more stripe patterns in the volume repeatedly in real time, the above identification process may be based on recent historical information. That is the pattern image positions have changed very little from their position in preceding video frames. If so, the previous identity of stripe images may be recovered by matching each current stripe image with the closest stripe image in a preceding video image from the same camera.

An embodiment may use another way of identifying which stripe of which stripe pattern generated (projected) a given stripe image onto a given camera's video frame. Some stripe patterns, such as in FIG. 5*b*, may encode the identity of a pattern as a unique combination of varying relative lengths and/or relative widths of stripes. Such characteristics may be preserved in the stripe images of the stripes of the pattern. The encoding may be understood as a simple form of a bar code, like the UPC codes on consumer product packaging or the bar codes the US Postal Service prints on mailed envelopes. The encoding may be interpreted as a unique integer identifier. If an embodiment provides the encoded integer along with the reference lines which characterize the stripes in a particular pattern of stripes, then the identification of the pattern which generates a set of closely spaced stripe images may be readily derived from the images. For example, if stripes relatively shorter and/or thinner than others represent a binary 0 and if stripes relatively longer and/or wider represent a binary 1, then a set of parallel stripes and the set of stripe images generated by those stripes may be interpreted as a binary integer. An embodiment may impose some convention for the sequence in which stripe images generate the bits.

In the case of a "T-like" pattern of stripes, there may be further conventions for removing ambiguity, for speeding identification of a pattern, and for providing cross-checks. For example, as in FIG. 5*b*, one set of parallel stripes may have an even number of stripes and the orthogonal set of parallel stripes may have an odd number of stripes. Both sets of parallel stripes may encode binary digits representing an integer, with the lower significant digits encoded in the even-numbered set of stripes. Further, an embodiment can impose a convention to examine the stripe images in a prescribed sequence to decode the binary digits into an integer. Still further, an embodiment may create a copy of a set of stripe images, which have been rotated and skewed into a canonical position, such as an upright "T", before decoding binary digits from the stripe images and producing an integer identifying the pattern generating the images.

Another example of encoding an identifying integer in the stripe pattern may include "bulges" along the stripes, where the presence of a bulge at a given location represents a binary 1 and the absence of a bulge at a given location represents a binary 0. See FIG. 5*d*. Further, other marks, such as a row of dots parallel to the stripes, may provide information uniquely identifying a pattern but not necessarily contributing to the computation of the position of the pattern in the volume. See FIG. 5*a*.

After stripe images have been characterized by image lines, after lines of intersection have been computed from the planes prescribed by the image lines, and after the pattern and stripes generating the stripe images have been identified, the 3-d position of the pattern can be determined. The position of a pattern in the global coordinate system 10 may be described by a conventional linear transformation. The transformation maps the set of reference lines of the stripes in the pattern to the corresponding lines of intersection. The reference lines were specified with respect to the local coordinate system of the object to which the pattern is affixed. The lines of intersection are computed relative to the global coordinate system. The transformation describes a relationship between the local and global coordinate systems.

After the linear transformation has been computed, the transformation may be used to map the coordinates of the reference point and/or each reference vector defined in the object's local coordinate system to coordinates relative to the global coordinate system. The coordinates may be reported as positional information about the object to which the pattern is affixed. The positional information may include the location coordinates, the orientation coordinates, the linear transformation itself, and/or the time at which the video frames were acquired. Other positional information may be derived, such as the distance between two objects, the current direction of relative or global motion of an object, the linear and rotational velocity of the object, the positional relationship of one object to a second object, or other representations of the position of an object.

As shown in FIG. 2, the system comprises a digital computer 6 adapted to receive a video frame of pixel array data from each camera over a data transmission channel 8 from each of the two or more cameras 20*a*, 20*b*. The computer 6 is configured by means of a memory-stored firmware or software program to locate the 2-d image of each visible stripe in the frame and to estimate the best-fit centerline and/or longitudinal edge lines for some or all of the stripe images within the frames of the cameras. Some or all of the previously described computations may be performed in the arithmetic hardware of the computer 6. Some or all of the procedural steps 100, . . . , 195 of a method—such as the method of FIG. 7 described below—may be performed by the program stored as executable instructions in a memory of the computer 6 to be executed by the computer 6. A method, such as exemplified in FIG. 7, can be embodied and executed in a system as a configuration of instructions of a program for a specific digital computer, such as a personal laptop computer running the program under a version of the Microsoft Windows operating system. The program may be recorded as a physical representation of instructions and data in solid-state ROM/PROM/EEPROM, a magnetic medium, an optical disk, or another storage device.

An embodiment will be described with reference to FIG. 7. The left column of steps of FIG. 7 generally involves set-up or initialization: Steps 100 through 135. The right column may be repeated at a rate fast enough to provide essentially continuous determination of the location and orientation of an object over a period of time: Steps 145 through 195.

The embodiment may begin with positioning at least two cameras so their field of view more or less coincides with the volume of interest within which a object is to be tracked and on which is defined a 3-d coordinate system: Step 100 of FIG. 7. The cameras may be standard or high-resolution video cameras. For applications not requiring real-time acquisition speed, digital still cameras having a computer control and data interface may be employed. The cameras may be adapted to project the volume of interest onto a pixel array, generating a video frame capturing a 2-dimensional perspective image of the volume. The image may include any high-contrast patterns of stripes within the volume: Step 105. This adapting may include installing lenses with appropriate focal lengths and apertures onto the cameras.

Each camera 20$a,b$ may need individual calibration to compensate for non-linear lens distortions and aberrations, and each camera's lens may be adapted to a fixed focus. In other words, the calibration in effect can determine how to adjust pixel coordinates to cause each camera 20$a,b$ to act like an ideal or pin-hole camera with a fixed "perspective point" 24 through which all image projecting light rays 26 travel. Then the location and orientation of each camera 20$a,b$ may be determined relative to a 3-dimensional coordinate system 10 defined fixed with respect to the volume of interest: Step 110. The calibration will determine the relationship between any line in the 3-dimensional volume and where an image of that line projects onto the pixel array of each given camera 20$a,b$. Conversely, the relationship prescribes which unique plane contains all the lines in the volume that can project onto a given linear image in the camera 20$a,b$.

A method of calibrating the cameras 20$a,b$ is described by the Tsai paper included herein by reference. The method may include both the correction for aberration and distortion and the location of each camera within the 3-d coordinate system. Although the Tsai calibration method uses points in a volume of interest and corresponding images of those points in each camera 20$a,b$, the method determines a best-fit linear projection, which can nevertheless be used by the presently described method: Step 110.

For each moveable object 12$a$ to be tracked, a local coordinate system is defined in fixed relationship to the object: Step 115. Within the object's local object coordinate system 14$a$, a reference point 16 may be defined, which can be used to report the location of the object 12$a$ relative to the volume's coordinate system 10: Step 120. To characterize the orientation of the object 12$a$ relative to the volume's coordinate system 10, reference vectors 18$a,b$ may be defined: Step 125. The reference vectors 18$a,b$ at this point are defined in terms of the local coordinate system 14$a$ of the object 12$a$. In order to track the location and orientation of the object 12$a$, a pattern 50$a$ of high-contrast stripes 52 is affixed or otherwise rigidly fixed to each object 12$a$: Step 130. The geometrical details of the stripes 52 of each pattern 50$a$ are defined in terms of the object's local coordinate system 14$a$ and may include the centerlines, edge lines, stripes' widths, stripes' lengths, stripes' spacing, colors, and any other visual identifying characterizations for each stripe 52 of the pattern 50$a$: Step 135. Conversely, the coordinate system 14$a$ may first be defined with respect to the pattern 50$a$, and when the pattern 50$a$ is affixed to the object 12$a$, the object 12$a$ inherits the local coordinate system 14$a$ of the pattern 50$a$.

Figure 7:
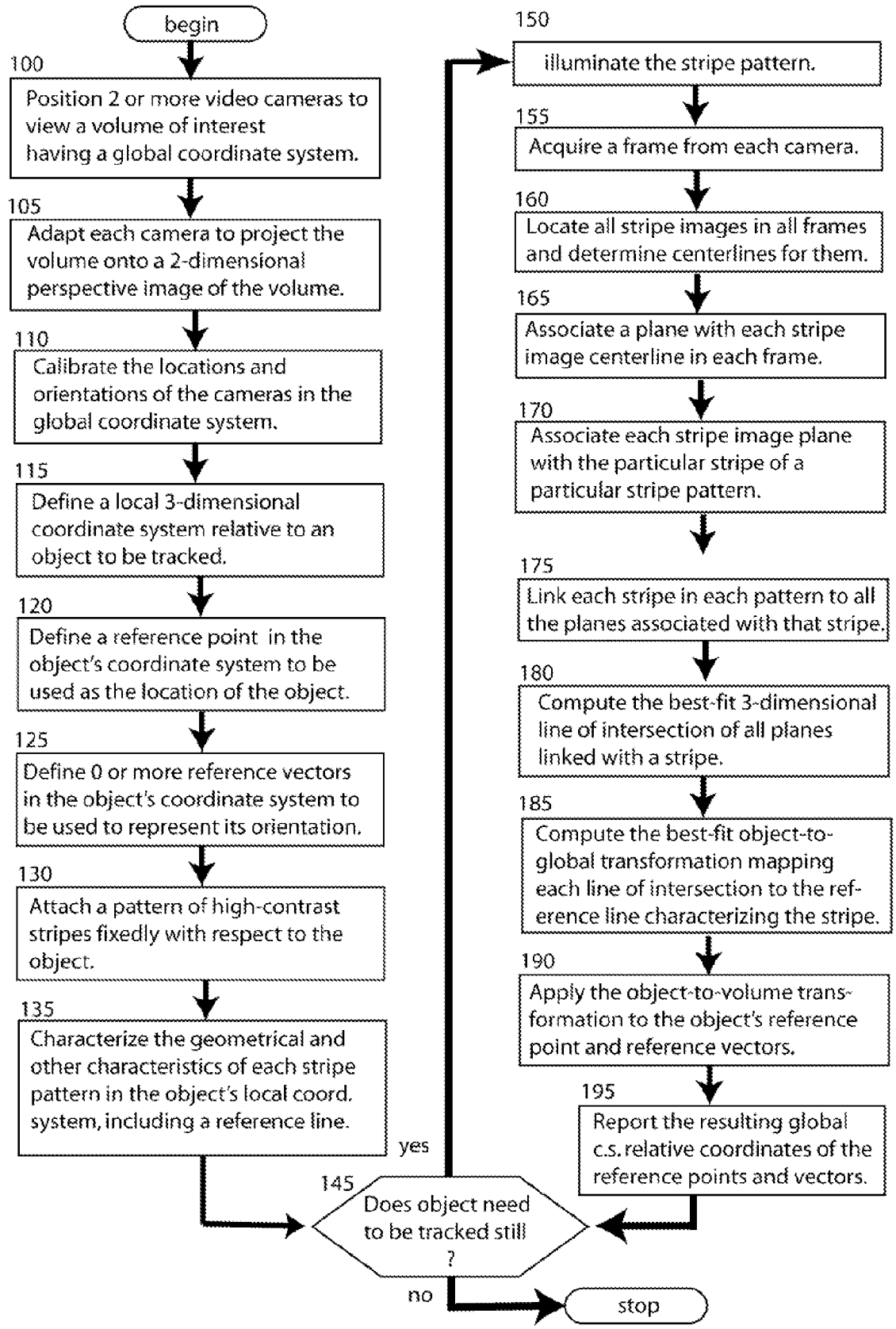
FIG. 7 is a flowchart of the procedural steps of a method embodiment of the patent.

The Steps 100 through 135 need not necessarily be performed in the order shown in FIG. 7. For example, the local coordinate system may be defined after the pattern is affixed to the object, or the positioning and adapting of the cameras may be performed after the defining of the object's coordinate system and/or characterizing the stripe patterns.

Once the above steps have been performed, that is, the cameras 20$a,b$ and object 12$a$ or objects have been readied, tracking of the position of object 12$a$ may commence. Tracking may be performed repeatedly and essentially continuously, as long as fresh position information about the object 12$a$ is needed by an application: Step 145. The stripe pattern 50$a$ or patterns must be adequately illuminated in order for the patterns 50$a$ to generate images on the pixel arrays of the cameras 20$a,b$: Step 150. The stripes 52 of the pattern 50$a$ may be actively self-illuminated or may passively reflect directed or ambient light.

The cameras 20$a,b$ transmit and the computer 6 acquires a video frame from the pixel array 30 of each of at least two cameras 20$a,b$ for subsequent processing: Step 155. The present method then finds and locates potential stripe images 42 in each camera's pixel array 30: Step 160. This may include applying any distortion compensation adjustments that were determined in Step 105. The distortion compensation may map any given pixel located in column C row R to a 2-d coordinate pair which represents the location of the center of the pixel as if the pixel were in an ideal camera. Following distortion correction, many 2-dimensional sub-pixel centroid coordinates along the centerline 48 of each stripe image 42 may be computed. Many 2-dimensional sub-pixel coordinates along one or both edges 49$a,b$ of each stripe may be computed: Step 160. Step 160 also includes determining a best-fit line for the centroid coordinates of the image centerline 48 and/or determining a best-fit image line 49$a,b$ fitting the estimated edge coordinates for each stripe image.

Note that the "location" of a line is not any particular single point or group of points, although one way to describe the line is by using the coordinates of some arbitrary point on the line and the slope of the line. Alternatively, it may be convenient to represent the line by two points, each near one end of the image associated with the line. However, it is the line itself, not any particular points, which are the basis of the eventual determination of where the object 12$a$ lies in the volume. In particular, a preferred representation of a 2-d centerline 48 or edge line 49$a,b$ would be the distance of the line from the origin of a coordinate system defined on the pixel array and a 2-d unit vector pointed away from the origin and perpendicular to the line. The latter representation involves no specific points on the line or stripe image 42.

Regarding a 2-d coordinate system defined on the pixel array—and similarly on any video frame produced by the pixel array—the coordinate system may simply reflect pixel column and row indices (C, R) within the pixel array. Alternatively, the coordinate system may be defined independently of the discrete pixel resolution, for example, by defining the origin of a local video frame coordinate system as the center of the frame with normalized horizontal and vertical coordinates (XY), which each run from −1.0 to +1.0. Furthermore, this 2-d coordinate system may be defined relative to a local 3-d camera coordinate system by simply adding a Z=−1 component to the normalized (XY) video frame coordinates. See FIG. 6a.

Given the location and orientation of a camera 20a,b including its pixel array 30, there is a unique, single 3-d plane in the volume prescribed by a 2-d image line on the pixel array 30. The plane contains the perspective point 24 of the camera 20a,b and the image line of a stripe image 42 in the 2-d video frame 44 of the camera's pixel array 30: Step 165. The image line may be the centerline 48 or an edge line 49a,b. The unique plane so prescribed from the image line of the stripe image uses the perspective projection which was a result of Step 110.

Stripe images 42 from different cameras 20a,b may then be associated with a stripe 52 in the volume: Step 170. One way to associate homologous stripe images from two different cameras to a given stripe in the volume is to determine whether the line of intersection the two 3-d planes associated with the two images would roughly project back onto the corresponding image lines in all cameras. Furthermore, an embodiment may project the endpoints of the image in the video image of a Camera A out to the 3-d line of intersection of the planes in the volume, forming putative endpoints of the stripe in space. Then the embodiment may project the putative spatial endpoints to the 2-d stripe image in a Camera B's video frame. If the projected locations in the Camera B's video frame lie within a few pixels of the actual endpoints of the image in the Camera B, the image of the Camera A and the image of the Camera B very likely are homologous images of the same stripe and are therefore associated. If not, some other image pairing should be tried.

Rather than testing the association of a pair of images using the end points of the images 42 in the manner above, the mid-points of two putatively associated images may be tested in a similar manner. In any case, the endpoints or mid-points are not otherwise used in the calculation of position information, but only as an optional aide to help in matching the stripe images 42 from different cameras' video frames 44. There are other ways to associate the images from different cameras which do not require matching endpoints or centers. For example, the approximate 3-d length (or width) of a stripe can be estimated from the direction and distance of the line of intersection in space and the length of the 2-d image of the stripe in each video frame. If the 3-d lengths differ by more than some tolerance distance, the images are not associated. Furthermore, if the actual stripes 52 are of various colors or contain unique identifying characteristics, such as the stripe patterns of FIG. 5d, these characteristics may be discernable in the corresponding stripe images 42 and would aid the associating of homologous stripe images 42 in two or more different cameras 20a,b. The pair-wise associations just described then may be used to form the set of stripe images 42 from all cameras 20a,b which are homologous images of the same stripe 52.

Once the stripe images 42 from different cameras 20a,b have been properly associated as homologous images of the same stripe 52, an embodiment can compute the line of intersection of all the planes that are prescribed by the image lines 48 or 49a,b of those homologous images 42 from at least two cameras' video frames 44: Step 180. An embodiment would use the same choice of image line, such as centerline 48 or edge line 49a,b, for all the homologous images 42. For a system with only two cameras 20a,b, the line of intersection will be unique, unless the planes are coplanar, which case may be handled differently. If the planes are parallel and not coplanar, a calibration or other system error exists. For more than two cameras, pairs of the planes may not all exactly intersect in a common single line of intersection, so a best-fit or average of all the lines of intersection can be used. Alternatively, choose the intersection line for just the two planes which intersect at the greatest dihedral angle. If the intersection lines of pair-wise planes are too far from each other, there may be a mismatch of images, so an error indication should be generated or the data should be rejected and ignored until the next set of video frames are processed.

Given the set of stripes 52 corresponding to the pattern 50a affixed to a given object 12a, the embodiment determines a best-fit linear transformation which maps each stripe's reference line to the currently computed line of intersection: Step 190. The reference line was defined with respect to the object's local coordinate system (in Step 135). The line of intersection in the volume is currently computed for the stripe 52 from two or more images of the stripe.

Once the linear transformation is determined, apply the transformation to the local coordinates of the reference point 16 and reference vectors 18a,b (if any) of the object 12a. The result is the coordinates of the reference point 16 and vectors 18a,b with respect to the volume's global coordinate system 10. The embodiment then reports the final coordinates as the position information about the object: Step 195. The method may be performed for each object in the volume visible to at least two cameras. If the object needs to be tracked further, the embodiment repeats Steps 145 through 195.

An objection may be raised that for two cameras 20a,b, the above method would fail for the pathological case when a stripe is parallel to the line between the lenses of the two cameras. It is true that the two planes prescribed by, say, the centerlines of the images 42 in the two cameras 20a,b are co-planar and therefore do not have a unique line of intersection. Then the current location of reference line of the stripe in the volume is underdetermined. Of course a third camera, not in-line with the other cameras, can resolve the ambiguity. Nevertheless, even for only two cameras, the ambiguity is at least partly resolved by a second stripe which is in the same pattern as the first stripe but which is not parallel to the first stripe. The reference line for the second stripe will unambiguously map to the line of intersection of two non-co-planar prescribed planes, because the line is not parallel to the line between the cameras. Nevertheless, there can remain some rotational ambiguity about where the first line lies around the axis of the second stripe's reference line. The ambiguity may be resolved by paying attention to the stereo disparity of the ends of the stripes, but that may provide less accuracy than the general case. However, at least one more stripe, such as another stripe not parallel to the first stripe can resolve the ambiguity. Hence, it may be advantageous to use stripe patterns 50a with more than just two stripes 52.

Figure 8:
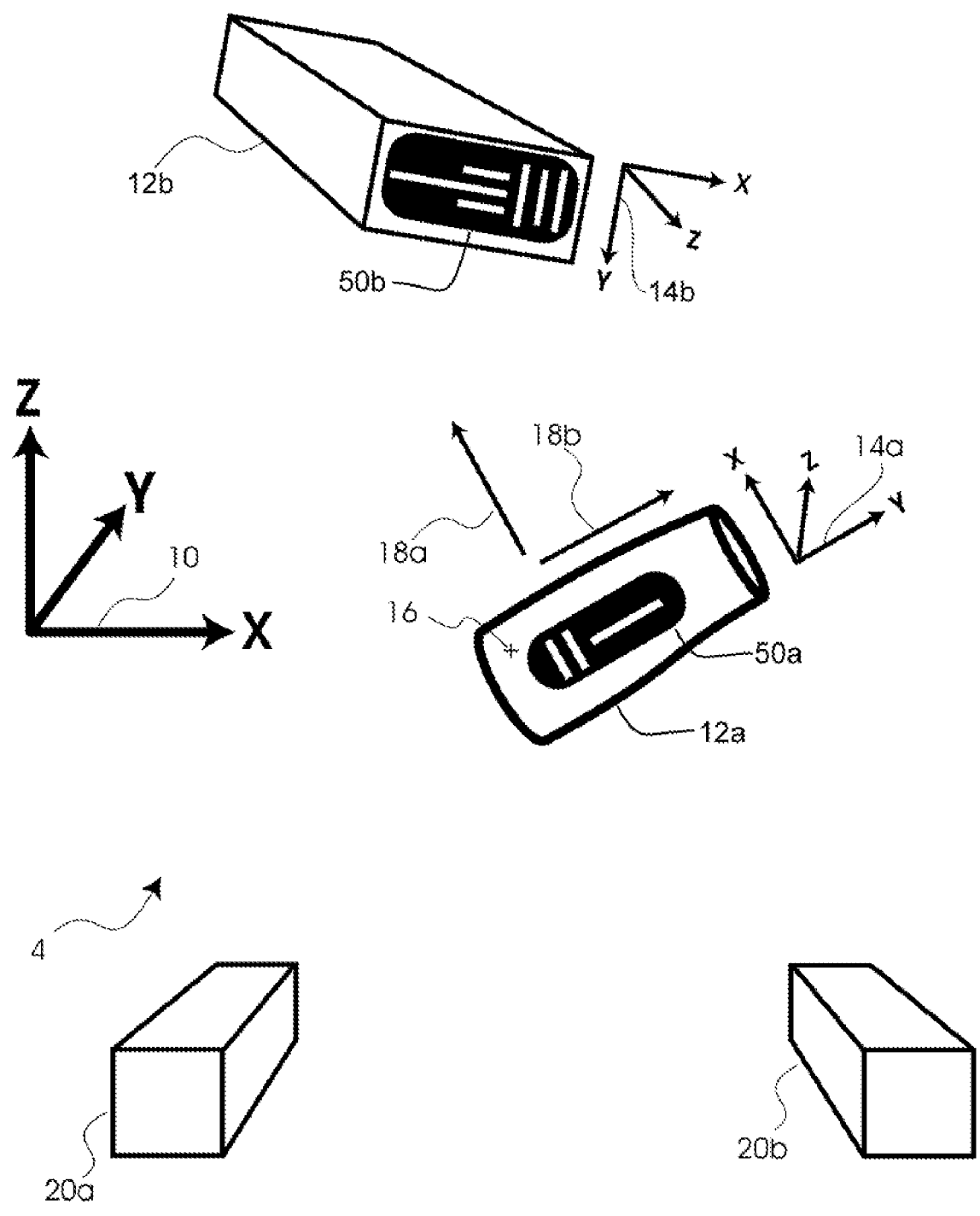
FIG. 8 shows a first object, the reference point and reference vectors of which are being tracked with respect to the local coordinate system of a second object.

While the above description included a global coordinate system 10 to which all the cameras are calibrated, a further embodiment of the method and of a system embodying the method may distinguish the global coordinate system from an application-defined—or user defined—coordinate system. In this case, the global coordinate system may serve as a common camera set or "stereo" coordinate system, as in FIG. 8. The application coordinate system, on the other hand, may have an origin and have axes which are conveniently positioned for a particular object tracking application, such as tracking a surgical instrument with respect to a coordinate system defined on a patient. The application coordinate system may be established by the user of an embodiment, while the global or stereo coordinate system is fixed with respect to the cameras' configuration. The application coordinate system may be static, or the application coordinate system may move with respect to the global coordinate system but be fixed with respect to a second object 12b as shown in FIG. 8. In the latter case, the position information about a first object, such as the location and orientation of the first object 12a, may be reported as second coordinates which are relative to the local coordinate system of the second object 12b. The second coordinates may be in addition to or in lieu of the position information about the first object 12a relative to the global coordinate system.

The second coordinates are computed by first transforming the reference point 16 and reference vectors 18a,b of the first object 12a to the volume coordinate system 10 using the best-fit object-to-volume transformation of the first object 12a (as described previously). Then the inverse of the best-fit object-to-volume transformation of the second object 12b (which was also computed previously) is applied to the global volume-relative coordinates of the reference point 16 and reference vectors 18a,b of the first object 12a.

The above paragraphs have described an embodiment utilizing patterns 50a of stripes 52 with straight centerlines or edges. An embodiment may instead employ stripes comprising one or more circular annuli, for example, or even more general geometries. In the case of a circular annulus, the methods and formula may be applied to each camera's image of the annulus, for which the curved edges of the image generally are two concentric ellipses, or closed elliptically curved lines. An ellipse exactly between the two edge ellipses forms an elliptical "centerline" for the image. The elliptical image centerline may be projected back out of the camera through its lens to prescribe an elliptical cylinder in the volume. A second camera prescribes a different elliptical cylinder in the volume from the image of the same annulus in the second camera. Each elliptical cylinder plays the same role as the plane prescribed by a image centerline in the case of straight stripes. Ignoring measurement imprecision, the intersection of the two elliptical cylinders is a circle coincident with the location of the reference "centerline" of the circular annulus itself. Note that a single annulus would be sufficient for object tracking purposes, because it is effectively provides localization information equivalent to multiple straight stripes at various angles. Similarly, embodiments may exist for patterns of stripes other than straight stripes or a circular annulus.

While the present invention has been disclosed by describing certain preferred embodiments, numerous modifications, alterations, and changes to the described embodiments are possible without departing from the spirit and scope of the present invention, as defined in the following claims. Accordingly, it is intended that the present invention not be limited to the described embodiments, but that the present invention have the full scope defined by the language of the following claims, and equivalents thereof.

I claim:

1. A system for determining position information about a first object in a volume, comprising:
   a global coordinate system defined in the volume;
   a local coordinate system in a known fixed relationship to the first object;
   a pattern of two or more stripes in a fixed relationship to the first object, wherein a first stripe of the pattern is characterized by a first reference line defined relative to the local coordinate system, and a second stripe of the pattern is characterized by a second reference line defined relative to the local coordinate system;
   two or more cameras, wherein each camera can output a 2-dimensional video frame, and wherein each video frame has a known relationship to the global coordinate system;
   a digital computer adapted to receive the video frame output from each camera; and
   a memory connected to the computer and containing a program of instructions which cause the computer to:
      locate a first set of stripe images of the first stripe, wherein each image in the first set of stripe images is in the video frame output by a camera of the two or more cameras,
      locate a second set of stripe images of the second stripe, wherein each image in the second set of stripe images is in the video frame output by a camera of the two or more cameras,
      determine, for each image of the first set of stripe images, a first image line in the video frame containing the image, wherein the first image line prescribes a first plane in the volume;
      determine, for each image of the second set of stripe images, a second image line in the video frame containing the image, wherein the second image line prescribes a second plane in the volume;
      compute a first line of intersection of the first planes prescribed by at least two of the first image lines,
      compute a second line of intersection of the second planes prescribed by at least two of the second image lines,
      determine a transformation between the local coordinate system and the global coordinate system, wherein the transformation maps the first reference line to the first line of intersection, and wherein the transformation maps the second reference line to the second line of intersection, and
      determine from the transformation the position information about the first object.

2. The system of claim 1, wherein at least one stripe of the two or more stripes has straight edges.

3. The system of claim 1, wherein at least one stripe of the two or more stripes has a straight centerline.

4. The system of claim 1, wherein the reference line characterizes an edge of the stripe.

5. The system of claim 1, wherein the reference line characterizes a centerline of the stripe.

6. The system of claim 1, wherein at least one stripe of the pattern has at least one feature which distinguishes the pattern from another pattern.

7. The system of claim 6, wherein the at least one feature is at least one of color, relative position, relative length, and relative width.

8. The system of claim 1, wherein at least one stripe of the pattern has at least one feature which differentiates the one stripe from another stripe of the pattern.

9. The system of claim 8, wherein the at least one feature is at least one of color, relative position, relative length, and relative width.

10. The system of claim 1, wherein the position information about the first object includes the time at which the position information was computed.

11. The system of claim 1, wherein the position information about the first object includes a location of the first object.

12. The system of claim 11, wherein a reference point defined as coordinates relative to the local coordinate system is mapped by the transformation to coordinates in the global coordinate system, and wherein the position information includes the coordinates of the reference point relative to the global coordinate system.

13. The system of claim 1, wherein the position information about the first object includes an orientation of the first object.

14. The system of claim 13, wherein at least one reference vector defined as coordinates relative to the local coordinate system is mapped by the transformation to coordinates in the global coordinate system, and wherein the position information includes the coordinates of the reference vector relative to the global coordinate system.

15. The system of claim 1, wherein the position information of the first object is determined in relation to a second coordinate system fixed with respect to a second pattern of lines affixed to a second object by which the system determines position information of the second object.

16. A method for determining positional information about a first object in a volume, comprising:
   defining a global coordinate system in the volume;
   defining a local coordinate system in a known fixed relationship to the first object;
   affixing a first pattern of two or more stripes in a relationship to the first object;
   characterizing a first stripe of the first pattern by a first reference line defined relative to the local coordinate system;
   characterizing a second stripe of the first pattern by a second reference line defined relative to the local coordinate system;
   positioning two or more cameras to view at least a portion of the volume;
   outputting a video frame from each of the two or more cameras, wherein each video frame has a known relationship to the volume;
   locating a first set of images of the first stripe, wherein each image in the first set of images is contained in the video frame output by a camera of the two or more cameras,
   locating a second set of images of the second stripe, wherein each image in the second set of images is contained in the video frame output by a camera of the two or more cameras,
   for each image in the first set of images, determining a first image line in the video frame containing the image, wherein the first image line prescribes a first plane in the volume;
   for each image in the second set of images, determining a second image line in the video frame containing the image, wherein the second image line prescribes a second plane in the volume;
   computing a first line of intersection of the first planes prescribed by at least two of the first image lines;
   computing a second line of intersection of the second planes prescribed by at least two of the second image lines;
   determining a transformation between the local coordinate system and the global coordinate system, wherein the transformation maps the first reference line to the first line of intersection, and wherein the transformation maps the second reference line to the second line of intersection; and
   determining the position information about the first object from the transformation.

17. The method of claim 16, wherein the first reference line characterizes an edge of the first stripe, and the second reference line characterizes an edge of the second stripe.

18. The method of claim 16, wherein the first reference line characterizes a centerline of the first stripe, and the second reference line characterizes a centerline of the second stripe.

19. The method of claim 16, additionally comprising:
   distinguishing the first pattern of stripes from any other pattern of stripes using at least one feature of at least one stripe of the first pattern.

20. The method of claim 19, wherein the at least one feature is at least one of color, relative position, relative length, and relative width.

21. The method of claim 16, additionally comprising:
   differentiating the first stripe of the first pattern from the second stripe of the first pattern using at least one feature which differs between the first stripe and the second stripe.

22. The method of claim 21, wherein the at least one feature is at least one of color, relative position, relative length, and relative width.

23. The method of claim 16, wherein the determining of the position information includes determining the time at which one camera of the two or more cameras output the video frame of one camera used to determine the position information.

24. The method of claim 16, wherein the determining of the position information includes determining a location of the first object.

25. The method of claim 24, wherein the determining a location of the first object includes using the transformation to map a reference point defined as coordinates relative to the local coordinate system of the first object to coordinates relative to the global coordinate system.

26. The method of claim 16, wherein the determining of the position information includes determining an orientation of the first object.

27. The method of claim 26, wherein the determining an orientation of the first object includes using the transformation to map at least one reference vector defined as coordinates relative to the local coordinate system of the first object to coordinates relative to the global coordinate system.

28. The method of claim 16, additionally comprising:
   determining second position information about a second object on which is defined a second coordinate system; and
   determining the position information about the first object with respect to the second coordinate system.

* * * * *